United States Patent
Ji et al.

(10) Patent No.: US 11,514,584 B2
(45) Date of Patent: Nov. 29, 2022

(54) METHOD, APPARATUS AND ELECTRONIC DEVICE FOR DETECTING A DISPLAY REGION OF A VIDEO IMAGE IN REAL TIME

(71) Applicant: AMLOGIC (SHANGHAI) CO., LTD., Shanghai (CN)

(72) Inventors: Ping Ji, Shanghai (CN); Zheng Bao, Shanghai (CN); Tao Ji, Shanghai (CN); Chun Wang, Shanghai (CN); Dongjian Wang, Shanghai (CN); Xuyun Chen, Shanghai (CN)

(73) Assignee: AMLOGIC (SHANGHAI) CO., LTD, Shanghai (CN)

( * ) Notice: Subject to any disclaimer, the term of this patent is extended or adjusted under 35 U.S.C. 154(b) by 0 days.

(21) Appl. No.: 17/444,394

(22) Filed: Aug. 4, 2021

(65) Prior Publication Data
US 2022/0044416 A1 Feb. 10, 2022

(30) Foreign Application Priority Data
Aug. 5, 2020 (CN) .......................... 202010776132.9

(51) Int. Cl.
*G06F 3/045* (2006.01)
*G06T 7/20* (2017.01)
*G06T 7/13* (2017.01)

(52) U.S. Cl.
CPC .................. *G06T 7/20* (2013.01); *G06T 7/13* (2017.01); *G06T 2207/10016* (2013.01)

(58) Field of Classification Search
CPC . G06T 2207/10016; G06T 2207/20132; G06T 7/12; G06T 7/13; G06T 7/20; G06T 7/215
See application file for complete search history.

(56) References Cited

U.S. PATENT DOCUMENTS

2018/0070818 A1\* 3/2018 Sakai ........................ G06T 5/50
2019/0287228 A1\* 9/2019 Sekiguchi ............... G06T 7/149

OTHER PUBLICATIONS

Extended European Search Report from related application 21189361.5 dated Dec. 23, 2021.

(Continued)

*Primary Examiner* — Insa Sadio
(74) *Attorney, Agent, or Firm* — Grossman, Tucker, Perreault & Pfleger, PLLC

(57) ABSTRACT

A method, apparatus and electronic device for detecting a display region of a video image in real time. The method includes: determining a bright pixel threshold line that distinguishes a display region from a black edge region of the current frame of image according to a pixel value of each pixel; determining a time-domain warning line according to time-domain motion statistic values of each row and each column of pixels of the current frame of image; determining a target optimal gradient line that distinguishes the display region from the black edge region of the current frame of image; and determining a boundary bright line between the display region and the black edge region of the current frame of image according to the bright pixel threshold line, the time-domain warning line and the target gradient line to determine the display region of the current frame of image.

20 Claims, 7 Drawing Sheets

(56) References Cited

OTHER PUBLICATIONS

Anonymous: "RoboCrop—Avisynth wiki1", Retrieved from the Internet: URL:http://avisynth.nl/index.php/RoboCrop, 2020, pp. 1-4.
Fransens et al, "The Reconstruction of Missing Frames in Historical Films, a Layered Approach", Computer Sraphics and Applications (Graphicon 2005) Fifteenth International Conference, Retrieved from the Internet: https://www.researchgate.net/profile/Fabian-Di-Fiore/pubiication/247768702_The_Reconstruction_of_Missing_Frames_in_Historical_Films_a_Layered_Approach/links/0046351dc9e360961b000000/The-Reconstruction-of-Missing-Frames-in-Historical-Films-a-Layered-Approach.pdf>, pp. 1-7.
Anonymous, "Detect and Remove Borders from Framed Photographs—OpenCV Q&A Forum", Retrieved from the Internet: https://answers.opencv.org/question/30082/detect-and-remove-borders-from-framed-photographs/, 2014, pp. 1-5.

* cited by examiner

METHOD, APPARATUS AND ELECTRONIC DEVICE FOR DETECTING A DISPLAY REGION OF A VIDEO IMAGE IN REAL TIME

CROSS-REFERENCE TO RELATED APPLICATIONS

This present application claims priority to Chinese Patent Application No. 202010776132.9 and filed with the CNIPA on Aug. 5, 2020, the content of which is incorporated herein by reference in its entirety.

FIELD

The present disclosure relates to the technical field of video processing, more particularly, to a method for detecting of a display region of a video image in real time, and an apparatus and electronic device for detecting a display region of a video image in real time.

BACKGROUND

When a video is played, there will be black edge regions. For example, in old filmstrips, there are invalid upper and lower black edge regions. For video image processing, the data in the black edge regions is meaningless and will affect the effect of image processing algorithms, especially motion compensation algorithms.

In the field of video editing, computer software is used to manually set the cropping regions by cutting. The actual display content in the video after separated out is saved as a new video code stream and then is played. This will make the video ratio the display panel proportion are inconsistent. Further, it is impossible to use this method in the video image algorithm processing, because the broadcast TV content is updated in real time, the black edge regions between scenes are not necessarily the same. From the perspective of user viewing, it is not desirable to cut the black edge region, which leads to the problem of poor viewing experience.

When performing image processing, as shown in FIG. 1, four bright lines such as an upper bright line, a lower bright line, a left bright line and a right bright line can be determined by a pixel brightness threshold method to separate an actual display region A from an invalid black edge region B in a frame image.

However, because the invalid black edge region is not necessarily pure black, instead has certain brightness, only adopting the method of pixel brightness threshold to determine a bright line that distinguishes the display region from the black edge region will generate a result which is not stable enough or even incorrect. When a video image has uneven distribution of light and dark, it will also affect the detection result of the black edge region, such as, the dark region is easily detected by mistake. For the case that the boundary of a frame image is not smooth enough, the detected position of the bright line will also be unstable, which affects other video image algorithms and final video image quality.

SUMMARY

The present disclosure aims to at least solve one of technical problems in the prior art.

To this end, one object of the present disclosure is to provide a method for detecting a display region of a video image in real time. The method can improve the stability and accuracy of detection of a display region of a video image.

A second object of the present disclosure is to provide an apparatus for detecting a display region of a video image in real time.

A third object of the present disclosure is to provide an electronic device.

In order to realize the above purposes, an embodiment of the first aspect of the present disclosure provides a method for detecting a display region of a video image in real time. The method includes: obtaining a pixel value of each pixel in a current frame of image, and determining a bright pixel threshold line that distinguishes a display region from a black edge region of the current frame of image according to the pixel value of each pixel; obtaining time-domain motion statistic values of pixels of the current frame of image relative to the corresponding pixels of the immediately preceding frame of image, and determining a time-domain warning line that distinguishes the display region from the black edge region of the current frame of image according to the time-domain motion statistic values of each row and each column of pixels of the current frame of image; obtaining gradient information of each row and each column of pixels in the current frame of image, and determining a target gradient line that distinguishes the display region from the black edge region of the current frame of image according to the gradient information of each row and each column of pixels; determining a boundary bright line between the display region and the black edge region of the current frame of image according to positions of the bright pixel threshold line, the time-domain warning line and the target gradient line; and determining the display region of the current frame of image according to the boundary bright line.

According to the method for detecting a display region of a video image in real time according to the embodiment of the present disclosure, the boundary bright line of the display region of the current frame of image is selected by comprehensively considering the bright pixel threshold, change of the motion statistic value, and the difference of the image edges. Compared to determining a boundary bright line only by the bright pixel threshold, the detection result is more accurate and stable. Further, for the case in which the boundary of frame of image is not smooth enough, the detection result of the display region is more stable by combination of these three types of lines based on feedback information. In addition, it can deal with a video code stream with uneven light and dark distribution effectively, obtain stable boundary bright line, and improve the video image algorithm and the final video image quality.

In some embodiments, the obtaining a pixel value of each pixel in a current frame of image, and determining a bright pixel threshold line that distinguishes a display region from a black edge region of the current frame of image according to the pixel value of each pixel includes: reading the pixel value of each pixel in each row of the current frame of image sequentially from top to bottom, counting the number of bright pixels in each row of pixels, and determining a row in which the number of bright pixels exceeds a first preset number threshold as the bright pixel threshold line that distinguishes the display region from an upper black edge region of the current frame of image, wherein if the pixel value is greater than a bright pixel threshold, a corresponding pixel is determined as a bright pixel; reading a pixel value of each pixel in each row of pixels in the current frame of image downward from the bright pixel threshold line that distinguishes the display region from the upper black edge region of the current frame of image, and determining, when the number of bright pixels in a current row of pixels exceeds the first preset number threshold and the number of bright pixels between the current row and the bright pixel threshold line that distinguishes the display region from the upper black edge region of the current frame of image exceeds a first bright pixel number threshold, the current row as a bright pixel threshold line that distinguishes the display region from the lower black edge region of the current frame of image; reading a pixel value of each pixel in each column of pixels in the current frame of image sequentially from left to right, counting the number of bright pixels in each column of pixels, and determining a column in which the number of bright pixels exceeds a second preset number threshold as a bright pixel threshold line that distinguishes the display region from a left black edge region of the current frame of image, wherein if the pixel value is greater than the bright pixel threshold, a corresponding pixel is determined as a bright pixel; and reading a pixel value of each pixel in each column of pixels in the current frame of image towards the right from the bright pixel threshold line that distinguishes the display region from the left black edge region of the current frame of image, and determining, when the number of bright pixels of a current column of pixels exceeds the second preset number threshold and the number of bright pixels between the current column and the bright pixel threshold line that distinguishes the display region from the left black edge region of the current frame of image exceeds a second bright pixel number threshold, the current column as a bright pixel threshold line that distinguishes the display region from the right black edge region of the current frame of image.

In some embodiments, the reading the pixel value of each pixel in each row of the current frame of image sequentially from top to bottom, counting the number of bright pixels in each row of pixels, and determining a row in which the number of bright pixels exceeds a first preset number threshold as the bright pixel threshold line that distinguishes the display region from an upper black edge region of the current frame of image, wherein if the pixel value is greater than a bright pixel threshold, a corresponding pixel is determined as a bright pixel, includes: reading a pixel value of each pixel in each row of pixels in the current frame of image sequentially from top to bottom; determining when the pixel value is greater than a first bright pixel sub-threshold, a corresponding pixel as a bright pixel, counting the number of bright pixels in each row of pixels, or determining the row in which the number of bright pixels exceeds the first preset number threshold as a first bright pixel threshold line that distinguishes the display region from the upper black edge region of the current frame of image, and determining, when the pixel value is greater than a second bright pixel sub-threshold, the corresponding pixel as a bright pixel, counting the number of bright pixels in each row of pixels, and determining a row in which the number of bright pixels exceeds the second preset number threshold as a second bright pixel threshold line that distinguishes the display region from the upper black edge region of the current frame of image, wherein the first bright pixel sub-threshold value is greater than the second bright pixel sub-threshold value. By setting dual thresholds, the robustness and flexibility of the method can be improved.

In some embodiments, the reading a pixel value of each pixel in each row of pixels in the current frame of image downward from the bright pixel threshold line that distinguishes the display region from the upper black edge region of the current frame of image, and determining, when the number of bright pixels in a current row of pixels exceeds the first preset number threshold and the number of bright pixels between the current row and the bright pixel threshold line that distinguishes the display region from the upper black edge region of the current frame of image exceeds a first bright pixel number threshold, the current row as a bright pixel threshold line that distinguishes the display region from the lower black edge region of the current frame of image, includes: reading the pixel value of each pixel in each row of pixels in the current frame of image sequentially downwards from the bright pixel threshold line that distinguishes the display region from the upper black edge region of the current frame of image; determining, when the pixel value is greater than a first bright pixel sub-threshold, a corresponding pixel as a bright pixel, counting the number of bright pixels in each row of pixels, and determining the row in which the number of bright pixels exceeds the first preset number threshold as a first bright pixel threshold line that distinguishes the display region from the lower black edge region of the current frame of image; or determining, when the pixel value is greater than a second bright pixel sub-threshold, a corresponding pixel as a bright pixel, counting the number of bright pixels in each row of pixels, and determining a row in which the number of bright pixels exceeds the second preset number threshold as a second bright pixel threshold line that distinguish the display region from the lower black edge region of the current frame of image. Here, the first bright pixel sub-threshold is greater than the second bright pixel sub-threshold. By setting dual thresholds, the robustness and flexibility of the method can be further improved.

In some embodiments, the reading a pixel value of each pixel in each column of pixels in the current frame of image sequentially from left to right, counting the number of bright pixels in each column of pixels, and determining a column in which the number of bright pixels exceeds a second preset number threshold as a bright pixel threshold line that distinguishes the display region from a left black edge region of the current frame of image, wherein if the pixel value is greater than the bright pixel threshold, a corresponding pixel is determined as a bright pixel, includes: obtaining the pixel value of each pixel in each column of pixels in the current frame of image sequentially from left to right; determining, when the pixel value is greater than a third bright pixel sub-threshold, the corresponding pixel as a bright pixel, counting the number of bright pixels in each column of pixels, and determining the column in which the number of bright pixels exceeds a third preset number threshold as a first bright pixel threshold line that distinguishes the display region from the left black edge region of the current frame of image, and determining, when the pixel value is greater than a fourth bright pixel sub-threshold, the corresponding pixel as a bright pixel, counting the number of bright pixels in each column of pixels, and determining the column in which the number of bright pixels exceeds a fourth preset number threshold as a second bright pixel threshold line that distinguishes the display region from the left black edge region of the current frame of image, wherein, the third bright pixel sub-threshold value is greater than the fourth bright pixel sub-threshold. By setting dual thresholds, the robustness and flexibility of the method can be further improved.

In some embodiments, the reading a pixel value of each pixel in each column of pixels in the current frame of image towards the right from the bright pixel threshold line that distinguishes the display region from the left black edge region of the current frame of image, and determining, when the number of bright pixels of a current column of pixels exceeds the second preset number threshold and the number of bright pixels between the current column and the bright pixel threshold line that distinguishes the display region from the left black edge region of the current frame of image exceeds a second bright pixel number threshold, the current column as a bright pixel threshold line that distinguishes the display region from the right black edge region of the current frame of image, includes: reading a pixel value of each pixel in each column of pixels in the current frame of image sequentially towards the right from the bright pixel threshold line that distinguishes the display region from the left black edge region of the current frame of image, determining, when the pixel value is greater than a third bright pixel sub-threshold, a corresponding pixel as a bright pixel, counting the number of bright pixels in each column of pixels, and determining the column in which the number of bright pixels exceeds a third preset number threshold as a first bright pixel threshold line that distinguishes the display region from the right black edge region of the current frame of image; or determining, when the pixel value is greater than a fourth bright pixel sub-threshold, the corresponding pixel as a bright pixel, counting the number of bright pixels in each column of pixels, and determining the column in which the number of bright pixels exceeds the fourth preset number threshold as a second bright pixel threshold line that distinguishes the display region from the right black edge region of the current frame of image, wherein the third bright pixel sub-threshold is greater than the fourth bright pixel sub-threshold.

In some embodiments, the obtaining time-domain motion statistic values of pixels of the current frame of image relative to the corresponding pixels of an immediately preceding frame of image, includes: obtaining a pixel value $I'_t(x, y)$ of a pixel at the position $(x, y)$ in the current frame of image, and obtaining a pixel value $I'_{t-1}(x, y)$ of a pixel at the same position $(x, y)$ in the immediately preceding frame of image; calculating a pixel difference value between $I'_t(x, y)$ and $I'_{t-1}(x, y)$; determining, when the pixel difference value is greater than a first pixel motion threshold, a time-domain motion difference value of the pixel at the position $(x, y)$ as a first time-domain motion difference value, and determining, when the pixel difference value is less than or equal to the first pixel motion threshold and greater than a second pixel motion threshold, the time-domain motion difference value of the pixel at position $(x, y)$ as a second time-domain motion difference value, wherein the first time-domain motion difference value is greater than the second time-domain motion difference value; and calculating a sum of the time-domain motion difference values of pixels in each row of pixels in the current frame of image to obtain a time-domain motion statistic value for each row, and calculating a sum of the time-domain motion difference values of pixels in each column of pixels in the current frame of image to obtain a time-domain motion statistic value for each column.

In some embodiments, the determining a time-domain warning line that distinguishes the display region from the black edge region of the current frame of image according to the time-domain motion statistic values of each row and each column of pixels of the current frame of image, includes: accumulating the time-domain motion statistic values of respective rows of the current frame of image sequentially from top to bottom, and determining when a total accumulated value of the time-domain motion statistic value of the current row and the time-domain motion statistic values of all preceding rows is greater than a first time-domain motion accumulation threshold, the current row as a time-domain warning line that distinguishes the display region from the upper black edge region of the current frame of image; accumulating the time-domain motion statistic values of respective rows of the current frame of image sequentially from bottom to top, and determining when a total accumulated value of the time-domain motion statistic value of the current row and the time-domain motion statistic values of all preceding rows is greater than the first time-domain motion accumulation threshold, the current row as a time-domain warning line that distinguishes the display region from the lower black edge region of the current frame of image; accumulating the time-domain motion statistic values of respective columns of the current frame of image sequentially from left to right, and determining when a total accumulated value of the time-domain motion statistic value of the current column and the time-domain motion statistic values of all preceding columns is greater than a second time-domain motion accumulation threshold, the current column as a time-domain warning line that distinguishes the display region from the left black edge region of the current frame of image; and accumulating the time-domain motion statistic values of respective columns of the current frame of image sequentially from right to left, and determining when a total accumulated value of the time-domain motion statistic value of the current column and the time-domain motion statistic values of all preceding columns is greater than the second time-domain motion accumulation threshold, the current column as a time-domain warning line that distinguishes the display region from the right black edge region of the current frame of image. By setting dual thresholds, the robustness and flexibility of the method can be further improved.

In some embodiments, the accumulating the time-domain motion vector statistic values of respective rows of the current frame of image sequentially from top to bottom, and determining when a total accumulated value of the time-domain motion statistic value of the current row and the time-domain motion statistic values of all preceding rows is greater than a first time-domain motion accumulation threshold, the current row as a time-domain warning line that distinguishes the display region from the upper black edge region of the current frame of image, includes: accumulating the time-domain motion statistic values of respective rows of the current frame of image sequentially from top to bottom; determining, when a total accumulated value of the time-domain motion statistic value of the current row and the time-domain motion statistic values of all preceding rows is greater than a first time-domain motion accumulation sub-threshold, the current row as a first time-domain warning line that distinguishes the display region from the upper black edge region of the current frame of image; or determining, when the total accumulated value of the time-domain motion statistic value of the current row and the time-domain motion statistic values of all preceding rows is greater than a second time-domain motion accumulation sub-threshold, the current row as a second time-domain warning line that distinguishes the display region from the upper black edge region of the current frame of image; wherein the first time-domain motion accumulation sub-threshold is greater than the second time-domain motion accumulation sub-threshold.

In some embodiments, the accumulating the time-domain motion statistic values of respective rows of the current frame of image sequentially from bottom to top, and determining when a total accumulated value of the time-domain motion statistic value of the current row and the time-domain motion statistic values of all preceding rows is greater than the first time-domain motion accumulation threshold, the current row as a time-domain warning line that distinguishes the display region from the lower black edge region of the current frame of image, includes: accumulating the time-domain motion statistic values of respective rows of the current frame of image sequentially from bottom to top; determining, when the total accumulated value of the time-domain motion statistic value of the current row and the time-domain motion statistic values of all preceding rows is greater than a first time-domain motion accumulation sub-threshold, the current row as a first time-domain warning line that distinguishes the display region from the lower black edge region of the current frame of image; or determining, when the total accumulated value of the time-domain motion statistic value of the current row and the time-domain motion statistic values of all preceding rows is greater than a second time-domain motion accumulation sub-threshold, the current row as a second time-domain warning line that distinguishes the display region from the lower black edge region of the current frame of image, wherein, the first time-domain motion accumulation sub-threshold is greater than the second time-domain motion accumulation sub-threshold.

In some embodiments, the accumulating the time-domain motion statistic values of respective columns of the current frame of image sequentially from left to right, and determining when a total accumulated value of the time-domain motion statistic value of the current column and the time-domain motion statistic values of all preceding columns is greater than a second time-domain motion accumulation threshold, the current column as a time-domain warning line that distinguishes the display region from the left black edge region of the current frame of image, includes: accumulating total values of time-domain motion statistic values of respective pixel blocks are sequentially from left to right, each pixel block including n columns of pixels, where n is an integer greater than 1; accumulating, when a total value of the time-domain motion statistic values obtained at a current pixel block is greater than a block motion threshold, the time-domain motion statistic values of respective columns of pixels in the current pixel block sequentially from left to right; determining, when a total accumulated value of the time-domain motion statistic value of the current column of pixels and the time-domain motion statistic values of all preceding columns in the current pixel block is greater than a third time-domain motion accumulation sub-threshold, the current column as a first time-domain warning line that distinguishes the display region from the left black edge region of the current frame of image; or determining, when the total accumulated value of the time-domain motion statistic value of the current column of pixels and the time-domain motion statistic values of all preceding columns in the current pixel block is greater than a fourth time-domain motion accumulation sub-threshold, the current column as a second time-domain warning line that distinguishes the display region from the left black edge region of the current frame of image, wherein the fourth time-domain motion accumulation sub-threshold is less than the third time-domain motion accumulation sub-threshold. By setting dual thresholds, the robustness and flexibility of the method can be further improved.

In some embodiments, the accumulating the time-domain motion statistic values of respective columns of the current frame of image sequentially from right to left, and determining when a total accumulated value of the time-domain motion statistic value of the current column and the time-domain motion statistic values of all preceding columns is greater than the second time-domain motion accumulation threshold, the current column as a time-domain warning line that distinguishes the display region from the right black edge region of the current frame of image, includes: accumulating total values of the time-domain motion statistic values of respective pixel blocks sequentially from right to left, wherein each pixel block includes n columns of pixels, where n is an integer greater than 1; accumulating, when a total value of the time-domain motion statistic values obtained at the current pixel block is greater than a block motion threshold, the time-domain motion statistic values of respective columns of pixels in the current pixel block sequentially from right to left; determining, when a total accumulated value of the time-domain motion statistic value of the current column of pixels and the time-domain motion statistic values of all preceding columns in the current pixel block is greater than a third time-domain motion accumulation sub-threshold, the current column as a first time-domain warning line that distinguishes the display region from the right black edge region of the current frame of image; or determining, when the total accumulated value of the time-domain motion statistic value of the current column of pixels and the time-domain motion statistic values of all preceding columns in the current pixel block is greater than a fourth time-domain motion accumulation sub-threshold, the current column as a second time-domain warning line that distinguishes the display region from the right black edge region of the current frame of image, wherein the fourth time-domain motion accumulation sub-threshold is less than the third time-domain motion accumulation sub-threshold. By setting dual thresholds, the robustness and flexibility of the method can be further improved.

In some embodiments, the obtaining gradient information of each row and each column of pixels in the current frame of image, and determining a target gradient line that distinguishes the display region from the black edge region of the current frame of image according to the gradient information of each row and each column of pixels, includes: obtaining a horizontal gradient value and vertical gradient value of each pixel in each row sequentially from top to bottom, determining when the horizontal gradient value of the pixel is less than a first horizontal gradient threshold and the vertical gradient value of the pixel is greater than a first vertical gradient threshold, the pixel as a bright pixel, and counting the number of bright pixels included in the current row; obtaining a horizontal gradient value and vertical gradient value of each pixel in each row sequentially from bottom to top, determining when the horizontal gradient value of the pixel is less than the first horizontal gradient threshold and the vertical gradient value of the pixel is greater than the first vertical gradient threshold, the pixel as a bright pixel, and counting the number of bright pixels included in the current row; obtaining a horizontal gradient value and vertical gradient value of each pixel in each column sequentially from left to right, determining when the horizontal gradient value of the pixel is greater than a second horizontal gradient threshold and the vertical gradient value of the current pixel is less than a second vertical gradient threshold, the pixel as a bright pixel, and counting the number of bright pixels included the current column; and obtaining a horizontal gradient value and vertical gradient value of each pixel in each column sequentially from right to left, determining when the horizontal gradient value of the pixel is greater than the second horizontal gradient threshold and the vertical gradient value of the pixel is less than the second vertical gradient threshold, the pixel as a bright pixel, and counting the number of bright pixels included in the current column.

In some embodiments, the obtaining gradient information of each row and each column of pixels in the current frame of image, and determining a target gradient line that distinguishes the display region from the black edge region of the current frame of image according to the gradient information of each row and each column of pixels, includes: for the upper black edge region, processing gradient information of the current row and gradient information of two rows which are adjacent to the current row respectively by filtering to obtain an average gradient, and determining when the average gradient is greater than a first edge threshold, the current row as a first target gradient line that distinguishes the display region from the upper black edge region of the current frame of image, or determining when the average gradient is greater than a second edge threshold, the current row as a second target gradient line that distinguishes the display region from the upper black edge region of the current frame of image, wherein the first edge gradient value is greater than the second edge gradient value, for the lower black edge region, processing gradient information of a current row and gradient information of two rows which are adjacent to the current row respectively by filtering to obtain an average gradient, determining when the average gradient is greater than the first edge threshold, the current row as a first target gradient line that distinguishes the display region from the lower black edge region of the current frame of image, or determining when the average gradient is greater than the second edge threshold, the current row as a second target gradient line that distinguishes the display region from the lower black edge region of the current frame of image; for the left black edge region, processing gradient information of a current column and gradient information of two columns which are adjacent to the current column respectively by filtering to obtain an average gradient, determining when the average gradient is greater than a first width threshold, the current column as a first target gradient line that distinguishes the display region from the left black edge region of the current frame of image, or determining when the average gradient is greater than a second width threshold, the current column as a second target gradient line that distinguishes the display region from the left black edge region of the current frame of image, wherein the first width threshold is greater than the second width threshold; and for the right black edge region, processing gradient information of a current column and gradient information of two columns which are adjacent to the current column respectively by filtering to obtain an average gradient, determining when the average gradient is greater than the first width threshold, the current column as a first target gradient line that distinguishes the display region from the right black edge region of the current frame of image, or determining when the average gradient is greater than the second width threshold, the current column as a second target gradient line that distinguishes the display region from the right black edge region of the current frame of image. By setting dual thresholds, the robustness and flexibility of the method can be further improved.

In some embodiments, the determining a boundary bright line for the display region of the current frame of image according to positions of the bright pixel threshold line, the time-domain warning line and the target gradient line, includes: for the upper black edge region or the lower black edge region or the left black edge region or the right black edge region, determining when a first bright pixel threshold line exists, the first bright pixel threshold line as a reference bright pixel threshold line;

determining, when the first bright pixel threshold line does not exist and a second bright pixel threshold line exists, the second bright pixel threshold line as the reference bright pixel threshold line;

determining, when both the first bright pixel threshold line and the second bright pixel threshold line do not exist, a bright pixel threshold line of the immediately preceding video frame as the reference bright pixel threshold line.

In some embodiments, said determining the boundary bright line between the display region and the black edge region of the current video frame according to the first target gradient line and the first time-domain warning line, includes: determining, if the first time-domain warning line is located at a position at an inner side of the first target gradient line and the first target gradient line is not at an image boundary, the first target gradient line is determined as the boundary bright line between the display region and the black edge region of the current video frame; maintaining, if the position of the first time-domain warning line is located at an inner side of the first target gradient line and the first target gradient line is located at the image boundary, the boundary bright line of the immediately preceding video frame as the boundary bright line of the current video frame; or determining, if the position of the first time-domain warning line is located at an inner side of the first target gradient line, the boundary bright line output as zero.

In some embodiments, the determining, if the position of the first target gradient line is located at an inner side of the reference bright pixel threshold line, the boundary bright line of the current video frame according to information on the boundary bright line of the immediately preceding video frame of the current video frame and information on boundary bright line of the current video frame, includes: if the target gradient line of the immediately preceding video frame is adjacent to the position of the first target gradient line of the current video frame, determining, if the first time-domain warning line of the current video frame is located at an inner side of the first target gradient line, the first target gradient line as the boundary bright line between the display region and the black edge region of the current video frame; or if the first time-domain warning line of the current video frame is located at an outer side of the first target gradient line, and the time-domain warning line of the immediately preceding video frame is located at an inner side of the first time-domain warning line of the current video frame, determining if the immediately preceding video frame has captions which do not change or the immediately preceding video frame has no captions, the first target gradient line as the boundary bright line between the display region and the black edge region of the current video frame, or determining if the immediately preceding video frame has captions which change, the reference bright pixel threshold line as the boundary bright line between the display region and the black edge region of the current video frame; or determining if the first time-domain warning line of the current video frame is located at an outer side of the first target gradient line, and the time-domain warning line of the immediately preceding video frame is located at an outer side of the first time-domain warning line of the current video frame, the reference bright pixel threshold line as the boundary bright line between the display region and the black edge region of the current video frame.

In some embodiments, the determining, if the position of the first target gradient line is located at an inner side of the reference bright pixel threshold line, the boundary bright line of the current video frame according to information on the boundary bright line of the immediately preceding video frame of the current video frame and information on boundary bright line of the current video frame, further includes: if the gradient line of the immediately preceding video frame is not adjacent to the position of the first target gradient line of the current video frame, determining, if the first time-domain warning line is located at an inner side of the first target gradient line, the first target gradient line as the boundary bright line between the display region and the black edge region of the current video frame; or searching for, if the first time-domain warning line is located at an outer side of the first target gradient line, the second target gradient line at an outer side of the first time-domain warning line, and determining, if the second target gradient line is found, the second target gradient line as the boundary bright line between the display region and the black edge region of the current video frame; or if the first time-domain warning line is located at an outer side of the first target gradient line and the second target gradient line is not found, determining a line of the reference bright pixel threshold line and the time-domain warning line of the immediately preceding video frame, which is closer to the outside of the display region, as the boundary bright line if the time-domain warning line of the immediately preceding video frame is located at an outer side of the second time-domain warning line, or determining the first target gradient line as the boundary bright line if the time-domain warning line of the immediately preceding video frame is located at an inner side of the second time-domain warning line and the immediately preceding video frame has captions which do not change or has no captions, or determining a reference zero threshold line as the boundary bright line if the time-domain warning line of the immediately preceding video frame is located at an inner side of the second time-domain warning line and the immediately preceding video frame has captions which change.

In some embodiments, the determining a boundary bright line for the display region of the current frame of image according to positions of the bright pixel threshold line, the time-domain warning line and the target gradient line, includes: for the upper black edge region or the lower black edge region or the left black edge region or the right black edge region, neither the first time-domain warning line nor the first target gradient line exists, determining, if both the first bright pixel threshold line and the second bright pixel threshold line exist, a line of the first bright pixel threshold line and the second bright pixel threshold line, which is located at a position closer to the outside of the display region, as the boundary bright line;

determining, if the first bright pixel threshold line does not exist and the second bright pixel threshold line exists, the second bright pixel threshold line as the boundary bright line;

determining, if the first bright pixel threshold line exists and the second bright pixel threshold line does not exist, the first bright pixel threshold line as the boundary bright line; or determining, if neither the first bright pixel threshold line nor the second bright pixel threshold line exists, an image edge is determined as the boundary bright line.

In some embodiments, said determining a boundary bright line for the display region of the current frame of image according to positions of the bright pixel threshold line, the time-domain warning line and the target gradient line, includes: for the upper black edge region or the lower black edge region or the left black edge region or the right black edge region, when the first time-domain warning line does not exist and the first target gradient line exists, determining, if the position of the reference bright pixel threshold line is adjacent to the position of the first target gradient line, a line of the reference bright pixel threshold line and the first target gradient line, which is closer to the inside of the display region, as the boundary bright line;

determining, if the reference bright pixel threshold line is located at an outer side of the first target gradient line, the first target gradient line as the boundary bright line; or if the reference bright pixel threshold line is located at an inner side of the first target gradient line, determining an image edge line as the boundary bright line when a second target gradient line exists at an outer side of the first target gradient line, or determining the first target gradient line as a boundary bright line when there is no there is no second target gradient line at the outer side of the first target gradient line.

In some embodiments, said determining a boundary bright line for the display region of the current frame of image according to positions of the bright pixel threshold line, the time-domain warning line and the target gradient line, includes: for the upper black edge region or the lower black edge region or the left black edge region or the right black edge region, when the first time-domain warning line exists and the first target gradient line does not exist, searching for the second target gradient line outward from the position of a line, which is closer to the inside of the display region, of the first time-domain warning and the reference bright pixel threshold line;

when the second gradient line being found and the second target gradient line being adjacent to the position of the first time-domain warning line, determining the line which is closer to the inside of the display region in the reference bright pixel threshold line and the second target gradient line as the boundary bright line if the reference bright pixel threshold line is adjacent to the second target gradient line, or determining the second target gradient line as the boundary bright line if the first time-domain warning line is located at an inner side of the second target gradient line and the second target gradient line is not at the image boundary, or determining the boundary bright line of the immediately preceding video frame as the boundary bright line of the current video frame if the first time-domain warning line is located at an inner side of the second target gradient line and the second target gradient line is at the image edge, or determining the image boundary line of the current video frame as the boundary bright line if the first time-domain warning line is located at an outer side of the second target gradient line; or when the second gradient line being not found, searching for the second target gradient line further outward from the position of a line, which is farther away from the display region, of the first time-domain warning line and the reference bright pixel threshold line, and determining the second target gradient line as the boundary bright line if the second target gradient line is found, or determining the reference bright pixel threshold line as the boundary bright line if the second target gradient line is not found and the reference bright pixel threshold line is located at the outer side of the first time-domain warning line, or determining the image boundary line of the current video frame as the boundary bright line if the second target gradient line is not found and the reference bright pixel threshold line is located at the inner side of the first time-domain warning line.

In order to realize the above purpose, an embodiment of the second aspect of the present disclosure provides an apparatus for detecting a display region of a video image in real time, including: a bright pixel threshold line obtaining module configured to obtain a pixel value of each pixel in a current frame of image, and determine a bright pixel threshold line that distinguishes a display region from a black edge region of the current frame of image according to the pixel value of each pixel; a time-domain warning line obtaining module configured to obtain time-domain motion statistic values of pixels of the current frame of image relative to the corresponding pixels of an immediately preceding frame of image, and to determine a time-domain warning line that distinguishes the display region from the black edge region of the current frame of image according to the time-domain motion statistic values of each row and each column of pixels of the current frame of image; a gradient line obtaining module configured to obtain gradient information of the pixels in each row and each column of the current frame of image, and determine a target gradient line that distinguishes the display region from the black edge region of the current frame of image according to the gradient information of the pixels in each row and each column; and a display region determining module configured to determine a boundary bright line between the display region and the black edge region of the current frame of image according to positions of the bright pixel threshold line, the time-domain warning line and the target gradient line and determine the display region of the current frame of image according to the boundary bright line.

The apparatus for detecting a display region of a video image in real time according to an embodiment of the present disclosure comprehensively considers the bright pixel threshold, the time-domain motion change, and the difference of the image edges based on the bright pixel threshold line obtaining module, the time-domain warning line obtaining module, and the gradient line obtaining module to select a boundary bright line of a display region of a current frame of image. Compared to determining a boundary bright line only by the bright pixel threshold, the detection result is more accurate and stable. Further, for the case in which the boundary of frame of image is not smooth enough, the detection result of the display region is more stable by combination of these three types of lines based on feedback information. In addition, it can deal with a video code stream with uneven light and dark distribution effectively. Therefore, a stable boundary bright line is obtained, and the video image algorithm and the final video image quality are improved.

In order to realize the above purpose, an embodiment of the third aspect of the present disclosure provides an electronic device. The electronic device includes: the apparatus for detecting a display region of a video image in real time described above, configured to determine the display region of the video image; an image processing apparatus configured to process the display region of the video image; a display apparatus connected to the image processing apparatus and configured to display the processed video image.

The electronic device according to the embodiment of the present disclosure selects a boundary bright line for the display region of a current frame of image by adopting the apparatus 10 for detecting a display region of a video image in real time in any of the above embodiments and comprehensively considering the bright pixel threshold, the motion vector change and the difference of the image edges. Compared to determining a boundary bright line only by the bright pixel threshold, the detection result is more accurate and stable. Further, for the case in which the boundary of frame of image is not smooth enough, the detection result of the display region is more stable by combination of these three types of lines based on feedback information. In addition, it can deal with a video code stream with uneven light and dark distribution effectively. Therefore, a stable boundary bright line is obtained, and the video image algorithm and the final video image quality are improved Additional aspects and advantages of the present disclosure will be given partially in the following description, and will become apparent partially from the following description, or will be known from the practice of the present disclosure.

BRIEF DESCRIPTION OF DRAWINGS

The above and/or additional aspects and advantages of the present disclosure will become apparent and readily appreciated from the description of embodiments in conjunction with the accompanying drawings, in which.

DETAILED DESCRIPTION

Hereinafter, embodiments of the present disclosure will be described in detail. The embodiments described below with reference to the accompanying drawings are exemplary. Embodiments of the present disclosure will be described in detail below.

Figure 1:
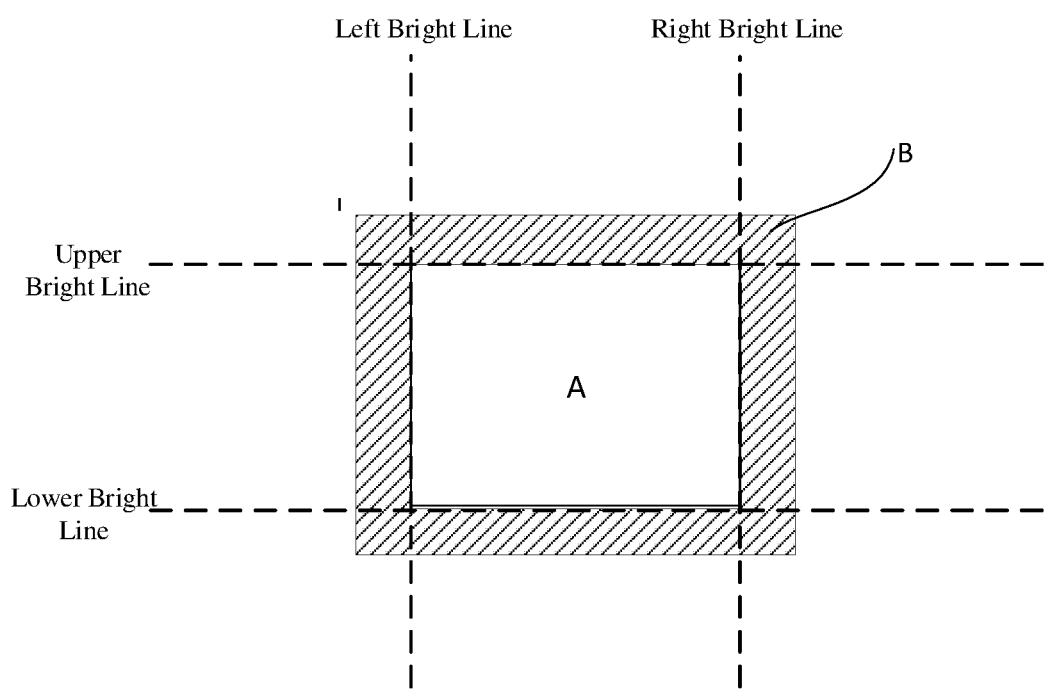
FIG. 1 is a schematic diagram illustrating determining a bright line between a black edge region and a display region based on a bright pixel threshold in the related art.

As shown in FIG. 1, a method for detecting a display region of a video image in real time according to an embodiment of the present disclosure is used to distinguish an invalid static black edge region B from an actual display region A in the video image, so that an image processing algorithm only performs processing on the actual display region to improve the robustness and accuracy of the algorithm.

It should be noted that in the embodiment, the expression "black" described in the black edge region does not mean pure black, but a relative concept. Assuming that a value of a certain pixel is Py, when Py is less than or equal to a set bright pixel threshold, the pixel can be determined as a "black pixel", otherwise it can be determined as a "bright pixel".

A method for detecting a display region of a video image in real time according to an embodiment of the present disclosure will be described below with reference to FIGS. 2-7.

Figure 2:
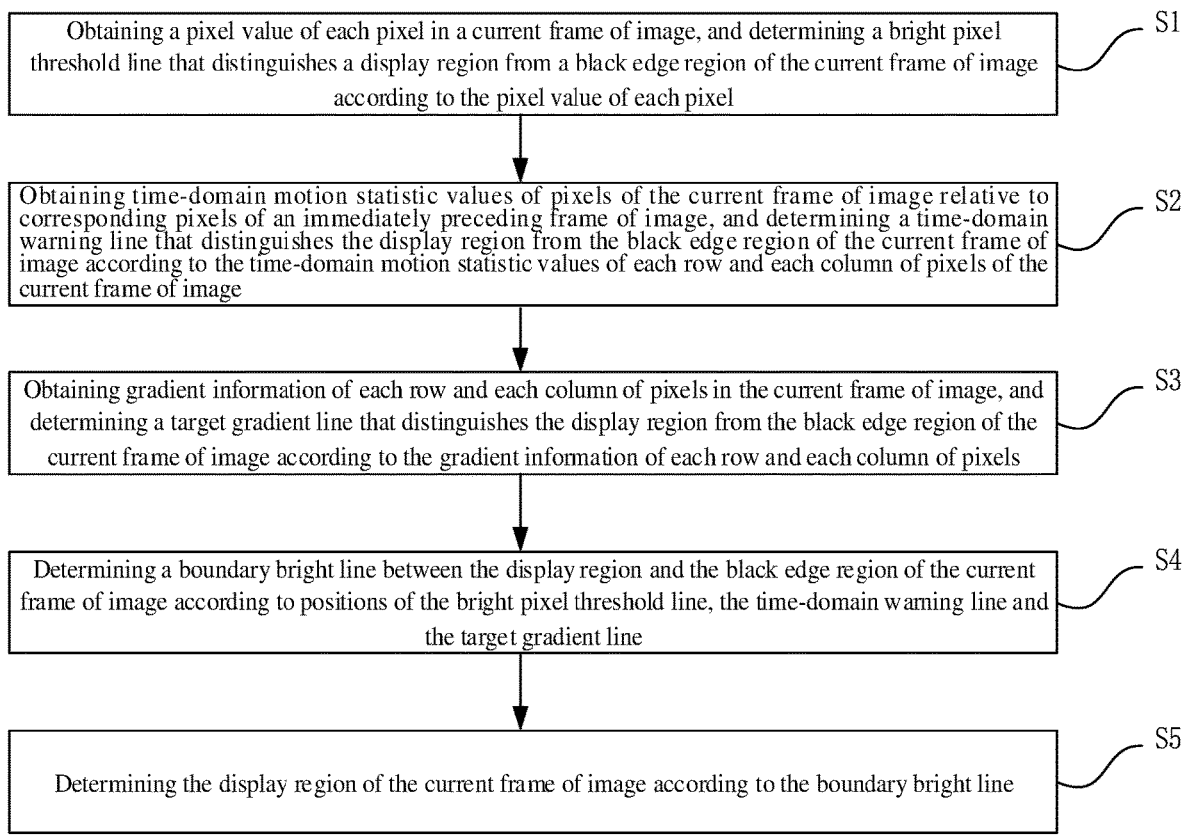
FIG. 2 is a flowchart illustrating a method for detecting a display region of a video image in real time according to an embodiment of the present disclosure.

FIG. 2 is a flowchart illustrating a method for detecting a display region of a video image in real time according to an embodiment of the present disclosure. As shown in FIG. 2, the method for detecting a display region of a video image in real time according to an embodiment of the present disclosure at least includes steps S1-S5, which are specifically as follows.

At Step S1, a pixel value of each pixel in a current frame of image is obtained, and a bright pixel threshold line that distinguishes a display region from a black edge region of the current frame of image is determined according to the pixel value of each pixel.

For a certain frame of image, its pixels are scanned and read sequentially from top to bottom and from left to right. Based on the following formula, each pixel is determined as a bright pixel or not, for example by a bright pixel threshold black_th:

$$\text{Pixel } P \text{ is } \begin{cases} \text{a bright pixel,} & \text{when } P_y > \text{black\_th} \\ \text{a black pixel,} & \text{others} \end{cases} \quad \text{formula (1)}$$

Figure 3:
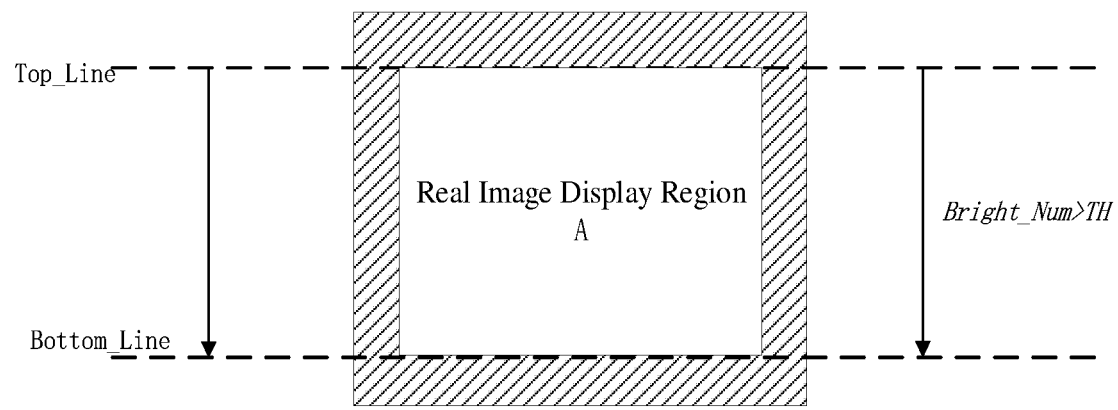
FIG. 3 is a schematic diagram illustrating determining a bright line between an upper black edge region and a display region and a bright line between a lower black edge region and the display region based on a bright pixel threshold according to an embodiment of the present disclosure.

FIG. 3 is a schematic diagram illustrating selecting a bright pixel threshold line between a display region and an upper black edge region and a bright pixel threshold line between a display region and a lower black edge region according to an embodiment of the present disclosure. It determines whether the number of bright pixels in each row of pixels is greater than a threshold, which finally determines the result of the selection of the bright pixel threshold line.

At Step S2, time-domain motion statistic values of pixels of the current frame of image relative to corresponding pixels of an immediately preceding frame of image are obtained, and a time-domain warning line that distinguishes the display region from the black edge region of the current frame of image is determined according to the time-domain motion statistic values of each row and each column of pixels of the current frame of image.

At step S3, gradient information of each row and each column of pixels in the current frame of image is obtained, and a target gradient line that distinguishes the display region from the black edge region of the current frame of image according to the gradient information of each row and each column of pixels in is determined.

At step S4, a boundary bright line between the display region and the black edge region of the current frame of image is determined according to positions of the bright pixel threshold line, the time-domain warning line and the target gradient line.

In the embodiment of the present disclosure, the bright pixel threshold line which is only determined using the bright pixel threshold is considered to have a low credibility. The gradient line is considered to have a relatively high credibility, since an edge of the black edge region having no lines and an edge of the actual display region are determined to have relatively large differences. The time-domain warning line in the embodiment of the present disclosure has a reference-warning function. The final detected result of the boundary bright line cannot exceed the time-domain warning line, because the black edge region having no lines does not have a substantial motion between frames.

In the embodiment, the bright pixel threshold line, the time-domain warning line and the target gradient line obtained through different bright line search methods are comprehensively considered. According to the existence and accuracy of the three types of bright lines, the most suitable line position therein is selected as a boundary bright line of the current frame of image.

At Step S5, the display region of the current frame of image is determined according to the boundary bright line, that is, the inner region surrounded by four boundary bright lines in an upper, lower, left, right portions of the current frame of image is the display region of the current frame of image, and the regions outside the inner region surrounded by the four boundary bright lines are four black edge regions in the upper, lower, left and right portions respectively.

Figure 4:
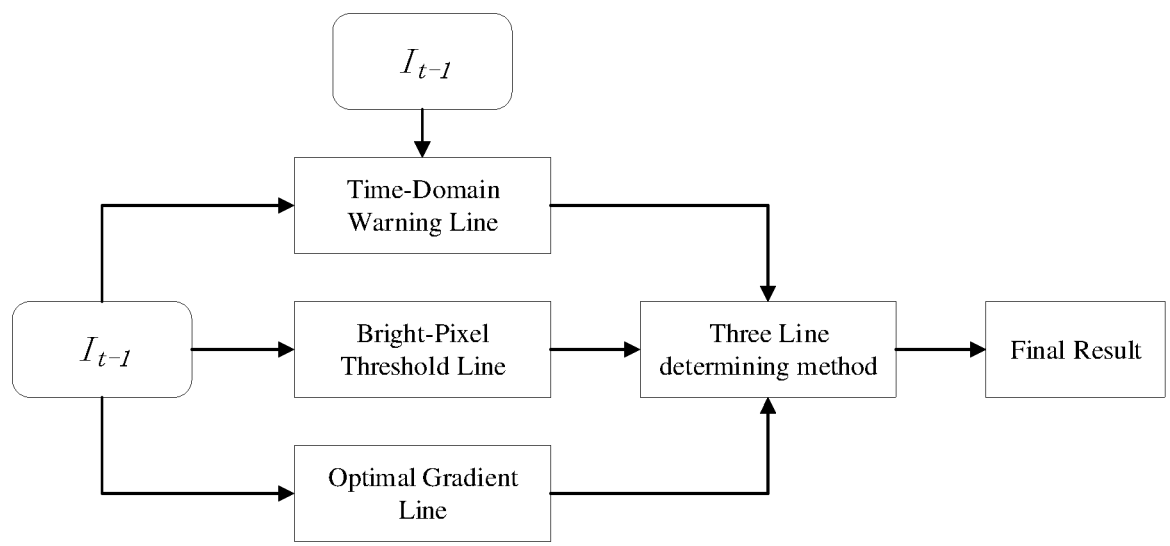
FIG. 4 is a schematic diagram illustrating a process of selecting a final bright line based on three lines according to an embodiment of the present disclosure.

That is, as shown in FIG. 4, the method for detecting a display region of a video image in real time in an embodiment of the present disclosure obtains the bright pixel threshold line and the target gradient line (that is, an optimal gradient line) based on the pixel value $I_t$ of the current frame of image, and obtains the time-domain warning line based on the pixel value of the current frame of image and the pixel value $I_{t-1}$ of the immediately preceding frame of image, and then determines a final detection result of the display region of the current frame of image by analysis based on these three types of lines.

According to the method for detecting a display region of a video image in real time according to the embodiment of the present disclosure, the boundary bright line of the display region of the current frame of image is selected by comprehensively considering the bright pixel threshold, the motion change, and the difference of the image edges. Compared to determining a boundary bright line only by the bright pixel threshold, the detection result is more accurate and stable. Further, for the case in which the boundary of frame of image is not smooth enough, the detection result of the display region is more stable by combination of these three types of lines based on feedback information. In addition, it can deal with a video code stream with uneven light and dark distribution effectively. Therefore, a stable boundary bright line is obtained, and the video image algorithm and the final video image quality are improved.

The process of obtaining the bright pixel threshold line, the time-domain warning line and the target gradient line and determining the final boundary bright line based on these three types of lines in the embodiment of the present disclosure will be described in further detail below.

First, the process of obtaining the bright pixel threshold line will be described below.

As shown in FIG. 3, for a certain frame of image, its pixels are scanned and read sequentially from top to bottom and from left to right. For the bright pixel threshold line between the display region and the upper black edge region of the current frame of image, a pixel value of each pixel in each row of the current frame of image is read sequentially from top to bottom. If the pixel value is greater than a bright pixel threshold, it is determined that a corresponding pixel is bright pixel. The number of bright pixels in each row of pixels are counted, and a row in which the number of bright pixels exceeds a first preset number threshold is determined as a bright pixel threshold line Top line that distinguishes the display region from the upper black edge region of the current frame of image.

For the bright pixel threshold line between the display region and the lower black edge region of the current frame of image, a pixel value of each pixel in each row of pixels in the current frame of image is read downward from the bright pixel threshold line that distinguishes the display region from the upper black edge region of the current frame of image. When the number of bright pixels in the current row of pixels exceeds the first preset number threshold, and the number of bright pixels between the current row and the bright pixel threshold line that distinguishes the display region from the upper black edge region of the current frame of image exceeds a first bright pixel number threshold, as shown by Bright_Num>TH in in FIG. 3, the current row is determined as the bright pixel threshold line Bottom_line that distinguishes the display region from the lower black edge region of the current frame of image.

For the bright pixel threshold line between the display region and the left black edge region of the current frame of image, a pixel value of each pixel in each column of pixels in the current frame of image is read sequentially from left to right. If the pixel value is greater than the bright pixel threshold, the corresponding pixel is determined to be a bright pixel. The number of bright pixels in each column of pixels is counted, and a column in which the number of bright pixels exceeds a second preset number threshold as a bright pixel threshold line that distinguishes the display region from the left black edge region of the current frame of image.

For the bright pixel threshold line between the display region and the right black edge region of the current frame of image, a pixel value of each pixel in each column of pixels in the current frame of image is read towards the right from the bright pixel threshold line that distinguishes the display region from the left black edge region of the current frame of image. When the number of bright pixels of the current column of pixels exceeds the second preset number threshold and the number of bright pixels between the current column and the bright pixel threshold line that distinguishes the display region from the left black edge region of the current frame of image exceeds a second bright pixel number threshold, the current column is determined as a bright pixel threshold line that distinguishes the display region from the right black edge region of the current frame of image.

Further, in some embodiments, in order to improve the robustness and flexibility of the method, the bright pixel threshold is set to have dual thresholds, so as to facilitate comprehensive analysis of the method for optimization and selection.

For example, for the bright pixel threshold line between the display region and the upper black edge region of the current frame of image, a pixel value of each pixel in each row of pixels in the current frame of image is read sequentially from top to bottom. When the pixel value is greater than a first bright pixel sub-threshold, the corresponding pixel is determined as a bright pixel. The number of bright pixels in each row of pixels is counted, and the row in which the number of bright pixels exceeds the first preset number threshold is determined as a first bright pixel threshold line that distinguishes the display region from the upper black edge region of the current frame of image. Or when the pixel value is greater than a second bright pixel sub-threshold, the corresponding pixel is determined as a bright pixel. The number of bright pixels in each row of pixels is counted, and a row in which the number of bright pixels exceeds the second preset number threshold is determined as a second bright pixel threshold line that distinguishes the display region from the upper black edge region of the current frame of image. Here, the first bright pixel sub-threshold value is greater than the second bright pixel sub-threshold value, that is, the first bright pixel sub-threshold is set to be stricter, and the second bright pixel sub-threshold is set to be looser, so that more abundant information on the bright pixel threshold line can be obtained.

For example, for the bright pixel threshold line between the display region and the lower black edge region of the current frame of image, a pixel value of each pixel in each row of pixels in the current frame of image is read sequentially downwards from the bright pixel threshold line that distinguishes the display region from the upper black edge region of the current frame of image. When the pixel value is greater than the first bright pixel sub-threshold, the corresponding pixel is determined as a bright pixel. The number of bright pixels in each row of pixels is counted, and the row in which the number of bright pixels exceeds the first preset number threshold is determined as a first bright pixel threshold line that distinguishes the display region from the lower black edge region of the current frame of image. Further, when the pixel value is greater than the second bright pixel sub-threshold, the corresponding pixel is determined as a bright pixel. The number of bright pixels in each row of pixels is counted, and a row in which the number of bright pixels exceeds the second preset number threshold is determined as a second bright pixel threshold line that distinguish the display region from the lower black edge region of the current frame of image. Here, the first bright pixel sub-threshold is greater than the second bright pixel sub-threshold, that is, the first bright pixel sub-threshold is set to be stricter, and the second bright pixel sub-threshold is set to be looser, so that more abundant information on the bright pixel threshold line can be obtained.

For example, for the bright pixel threshold line between the display region and the left black edge region of the current frame of image, a pixel value of each pixel in each column of pixels in the current frame of image is obtained sequentially from left to right. When the pixel value is greater than a third bright pixel sub-threshold, the corresponding pixel point is determined as a bright pixel. The number of bright pixels in each column of pixels is counted, and the column in which the number of bright pixels exceeds a third preset number threshold is determined as a first bright pixel threshold line that distinguishes the display region from the left black edge region of the current frame of image. Further, when the pixel value is greater than a fourth bright pixel sub-threshold, the corresponding pixel is determined as a bright pixel. The number of bright pixels in each column of pixels is counted, and the column in which the number of bright pixels exceeds a fourth preset number threshold is determined as a second bright pixel threshold line that distinguishes the display region from the left black edge region of the current frame of image. Here, the third bright pixel sub-threshold value is greater than the fourth bright pixel sub-threshold, that is, the third bright pixel sub-threshold is set to be stricter, and the fourth bright pixel sub-threshold is set to be looser, so that more abundant information on the bright pixel threshold line can be obtained.

For example, for the bright pixel threshold line between the display region and the right black edge region of the current frame of image, a pixel value of each pixel in each column of pixels in the current frame of image is read sequentially towards the right from the bright pixel threshold line that distinguishes the display region from the left black edge region of the current frame of image. When the pixel value is greater than the third bright pixel sub-threshold, the corresponding pixel is determined as a bright pixel. The number of bright pixels in each column of pixels is counted, and the column in which the number of bright pixels exceeds the third preset number threshold is determined as a first bright pixel threshold line that distinguishes the display region from the right black edge region of the current frame of image. Further, when the pixel value is greater than the fourth bright pixel sub-threshold, the corresponding pixel is determined as a bright pixel. The number of bright pixels in each column of pixels is counted, and the column in which the number of bright pixels exceeds the fourth preset number threshold is determined as a second bright pixel threshold line that distinguishes the display region from the right black edge region of the current frame of image. Here, the third bright pixel sub-threshold is greater than the fourth bright pixel sub-threshold, that is, the third bright pixel sub-threshold is set to be stricter, and the fourth bright pixel sub-threshold is set to be looser, so that more abundant information on the bright pixel threshold line can be obtained.

The process of obtaining the time-domain warning line will be described below.

In an embodiment, the time-domain warning line is determined based on the motion change between the current frame of image and the immediately preceding frame of image. A pixel value $I'_t(x, y)$ of a pixel at the position $(x, y)$ in the current frame of image is obtained, and a pixel value $I'_{t-1}(x, y)$ of a pixel at the same position $(x, y)$ in the immediately preceding frame of image is obtained. A pixel difference value between $I'_t(x, y)$ and $I'_{t-1}(x, y)$ is calculated. When the pixel difference value is greater than a first pixel motion threshold, a time-domain motion difference value of the pixel at the position $(x, y)$ is a first time-domain motion difference value. When the pixel difference value is less than or equal to the first pixel motion threshold and greater than a second pixel motion threshold, the time-domain motion difference value of the pixel at position $(x, y)$ is a second time-domain motion difference value. Here, the first time-domain motion difference value is greater than the second time-domain motion difference value. A sum of the time-domain motion difference values of pixels in each row of pixels in the current frame of image is calculated to obtain a time-domain motion statistic value for each row. Further, a sum of the time-domain motion difference values of pixels in each column of pixels in the current frame of image is calculated to obtain a time-domain motion statistic value for each column.

For example, taking a 1080 video frame of image I as an example, the time-domain motion change information, i.e., the real-time motion difference values, of each row and each column of I is calculated. The calculation method of the time-domain motion change (motion) of a pixel is as follows. A pixel value of a pixel at the position $(x, y)$ in the current frame of image is defined as $I'_t(x, y)$, and a pixel value of a pixel at the same position $(x, y)$ in the immediately preceding frame of image is defined as $I'_{t-1}(x, y)$, then the difference $d=|I'_t(x, y)-I'_{t-1}(x, y)|$. When d is greater than a first pixel motion threshold such as pix_motion_th1, the accumulative value for motion is a. When d is less than or equal to pix_motion_th1 and greater than a second pixel motion threshold, such as pix_motion_th2, the accumulative value for motion is b, where a>b. Finally, a sum of the motion information is computed according to the motion difference values of each row and each column of pixels respectively to obtain the time-domain motion statistic value of the pixels, which is used to detect the time-domain warning line later.

Specifically, the time-domain motion statistic values of respective rows of the current frame of image are sequentially accumulated from top to bottom. When the total accumulated value of the time-domain motion statistic value of the current row and the time-domain motion statistic values of all preceding rows is greater than the first time-domain motion accumulation threshold, the current row is determined as a time-domain warning line that distinguishes the display region from the upper black edge region of the current frame of image. The time-domain motion statistic values of respective rows of the current frame of image are sequentially accumulated from bottom to top. When the total accumulated value of the time-domain motion statistic value of the current row and the time-domain motion statistic values of all preceding rows is greater than the first time-domain motion accumulation threshold, the current row is determined as a time-domain warning line that distinguishes the display region from the lower black edge region of the current frame of image.

Further, the time-domain motion statistic values of respective columns of the current frame of image are accumulated sequentially from left to right. When the total accumulated value of the time-domain motion statistic value of the current column and the time-domain motion statistic values of all preceding columns is greater than a second time-domain motion accumulation threshold, the current column is determined as a time-domain warning line that distinguishes the display region from the left black edge region of the current frame of image. The time-domain motion statistic values of respective columns of the current frame of image are accumulated sequentially from right to left. When the total accumulated value of the time-domain motion statistic value of the current column and the time-domain motion statistic values of all preceding columns is greater than the second time-domain motion accumulation threshold, the current column is determined as a time-domain warning line that distinguishes the display region from the right black edge region of the current frame of image.

Furthermore, in the embodiment, in order to increase the robustness and flexibility of the method, each time-domain motion accumulation threshold is set as a double threshold.

For the time-domain warning line that distinguishes the display region from the upper black edge region of the current frame of image, the time-domain motion statistic values of respective rows of the current frame of image are accumulated sequentially from top to bottom. When the total accumulated value of the time-domain motion statistic value of the current row and the time-domain motion statistic values of all preceding rows is greater than a first time-domain motion accumulation sub-threshold, the current row is determined as a first time-domain warning line that distinguishes the display region from the upper black edge region of the current frame of image. Alternatively, when the total accumulated value of the time-domain motion statistic value of the current row and the time-domain motion statistic values of all preceding rows is greater than a second time-domain motion accumulation sub-threshold, the current row is determined as a second time-domain warning line that distinguishes the display region from the upper black edge region of the current frame of image. Here, the first time-domain motion accumulation sub-threshold is greater than the second time-domain motion accumulation sub-threshold, that is, the first time-domain motion accumulation sub-threshold is set more strictly, and the second time-domain motion accumulation sub-threshold is set loosely, so that more abundant information on the time-domain motion warning line for the upper black edge region can be obtained.

For example, after obtaining the time-domain motion statistic value (that is a total motion information) of each row in the current frame of image, a total accumulated value i.e., a total value of respective motion information, is obtained by accumulating respective time-domain motion statistic values from top to bottom. When the total value of respective motion information is greater than the first time-domain motion accumulation sub-threshold value such as row_motion_th2, the row is determined as the first time-domain warning line such as top_motion_line2. When the total value of respective motion information is greater than the second time-domain motion accumulation sub-threshold such as row_motion_th1, this row is determined as the second time-domain warning line for example top_motion_line1. Here, row_motion_th1 is less than row_motion_th2, therefore top_motion_line1 is less than or equal to top_motion_line2.

For the time-domain warning line that distinguishes the display region from the lower black edge region of the current frame of image, the time-domain motion statistic values of respective rows of the current frame of image are sequentially accumulated from bottom to top. When the total accumulated value of the time-domain motion statistic value of the current row and the time-domain motion statistic values of all preceding rows is greater than the first time-domain motion accumulation sub-threshold, the current row is determined as a first time-domain warning line that distinguishes the display region from the lower black edge region of the current frame of image. Alternatively, when the total accumulated value of the time-domain motion statistic value of the current row and the time-domain motion statistic values of all preceding rows is greater than the second time-domain motion accumulation sub-threshold, the current row is determined as a second time-domain warning line that distinguishes the display region from the lower black edge region of the current frame of image. Here, the first time-domain motion accumulation sub-threshold is greater than the second time-domain motion accumulation sub-threshold, that is, the first time-domain motion accumulation sub-threshold is set more strictly, and the second time-domain motion accumulation sub-threshold is set loosely, so that more abundant information on the time-domain motion warning line for the lower black edge region can be obtained.

For example, after obtaining the time-domain motion statistic value (that is a total motion information) of each row in the current frame of image, a total accumulated value, i.e., a total value of respective motion information, is obtained by accumulating respective time-domain motion statistic values from bottom to top. When the total value of respective motion information is greater than the first time-domain motion accumulation sub-threshold such as row_motion_th2, the row is determined as a first time-domain warning line such as bot_motion_line2. When the total value of respective motion information is greater than the second time-domain motion accumulation sub-threshold such as row_motion_th1, the row is determined as a second time-domain warning line bot_motion_line1. Here, row_motion_th1 is less than row_motion_th2, so that bot_motion_line1 is greater than or equal to top_motion_line2.

For searching for the time-domain warning line that distinguishes the display region from the left black edge region of the current frame of image, there is a rough search and a fine search. Specifically, total values of the time-domain motion statistic values of respective pixel blocks are sequentially accumulated from left to right. Each pixel block includes n columns of pixels, where n is an integer greater than 1. When a total value of the time-domain motion statistic values obtained at the current pixel block is greater than a block motion threshold, the time-domain motion statistic values of respective columns of pixels in the current pixel block are sequentially accumulated from left to right. When a total accumulated value of the time-domain motion statistic value of the current column of pixels and the time-domain motion statistic values of all preceding columns in the current pixel block is greater than a third time-domain motion accumulation sub-threshold, the current column is determined as a first time-domain warning line that distinguishes the display region from the left black edge region of the current frame of image. Alternatively, when the total accumulated value of the time-domain motion statistic value of the current column of pixels and the time-domain motion statistic values of all preceding columns in the current pixel block is greater than a fourth time-domain motion accumulation sub-threshold, the current column is determined as a second time-domain warning line that distinguishes the display region from the left black edge region of the current frame of image. Here, the fourth time-domain motion accumulation sub-threshold is less than the third time-domain motion accumulation sub-threshold, that is, the third time-domain motion accumulation sub-threshold is set more strictly, and the fourth time-domain motion accumulation sub-threshold is set loosely, so that more abundant information on the time-domain motion warning line for the left black edge region can be obtained.

Similarly, for searching for the time-domain warning line that distinguishes the display region from the right black edge region of the current frame of image, there is also a rough search and a fine search. Specifically, total values of the time-domain motion statistic values of respective pixel blocks are sequentially accumulated from right to left. Each pixel block includes n columns of pixels, and n is an integer greater than 1. When a total value of the time-domain motion statistic values obtained at the current pixel block is greater than a block motion threshold, the time-domain motion statistic values of respective columns of pixels in the current pixel block are sequentially accumulated from right to left. When a total accumulated value of the time-domain motion statistic value of the current column of pixels and the time-domain motion statistic values of all preceding columns in the current pixel block is greater than the third time-domain motion accumulation sub-threshold, the current column is determined as a first time-domain warning line that distinguishes the display region from the right black edge region of the current frame of image, Alternatively, when the total accumulated value of the time-domain motion statistic value of the current column of pixels and the time-domain motion statistic values of all preceding columns in the current pixel block is greater than the fourth time-domain motion accumulation sub-threshold, the current column is determined as a second time-domain warning line that distinguishes the display region from the right black edge region of the current frame of image. Here, the fourth time-domain motion accumulation sub-threshold is less than the third time-domain motion accumulation sub-threshold.

For example, for searching for the time-domain warning lines for the left and right black edge regions, when performing a rough search, a total accumulated value, i.e., a total value of respective motion information, is obtained by accumulating the accumulated values of the time-domain motion vectors on every n columns and stored in rough_lft_blk[n] and rough_rit_blk[n]. For rough_lft_blk [n], the total values of respective motion information for respective blocks are accumulated from left to right. When a total value rough_lft_cnt obtained by accumulation of total values of respective motion information is greater than the third time-domain motion accumulation sub-threshold such as col_motion_th2, the sequence number for the block can be saved for the fine search. And at the same time, the threshold for the fine search can be updated. When performing the fine search, a fine processing is performed on the n columns in the block having the sequence number obtained by the rough search, and a total motion information for each column is stored in the finer_lft_blk2[n], and respective total motion information of the columns is accumulated sequentially from left to right. When the accumulated value of respective total motion information is greater than the third time-domain motion accumulation sub-threshold such as final_lft_motion_th2, this column is determined as a first time-domain warning line such as lft_motion_line2 that distinguishes the display region from the left black edge region of the current frame of image. Similarly, using the fourth time-domain motion accumulation sub-threshold such as col_motion_th1, a second time-domain warning line such as lft_motion_line1 which can distinguish the display region from the left black edge region of the current frame of image can also be obtained.

The process of obtaining the target gradient line between the display region and the black edge region of the current frame image will be described below.

Specifically, a horizontal gradient value and vertical gradient value of each pixel in each row are obtained sequentially from top to bottom. When the horizontal gradient value of the pixel is less than a first horizontal gradient threshold and the vertical gradient value of the pixel is greater than a first vertical gradient threshold, the pixel is determined as a bright pixel, and the number of bright pixels included in the current row is counted. A horizontal gradient value and vertical gradient value of each pixel in each row is obtained sequentially from bottom to top. When the horizontal gradient value of the pixel is less than the first horizontal gradient threshold and the vertical gradient value of the pixel is greater than the first vertical gradient threshold, the pixel is determined as a bright pixel, and the number of bright pixels included in the current row is counted. A horizontal gradient value and vertical gradient value of each pixel in each column is obtained sequentially from left to right. When the horizontal gradient value of the pixel is greater than a second horizontal gradient threshold and the vertical gradient value of the current pixel is less than a second vertical gradient threshold, the pixel is determined as a bright pixel, and the number of bright pixels included the current column is counted. A horizontal gradient value and vertical gradient value of each pixel in each column is obtained sequentially from right to left. When the horizontal gradient value of the pixel is greater than the second horizontal gradient threshold and the vertical gradient value of the pixel is less than the second vertical gradient threshold, the pixel is determined as a bright pixel, and the number of bright pixels included in the current column is counted.

Figure 5:
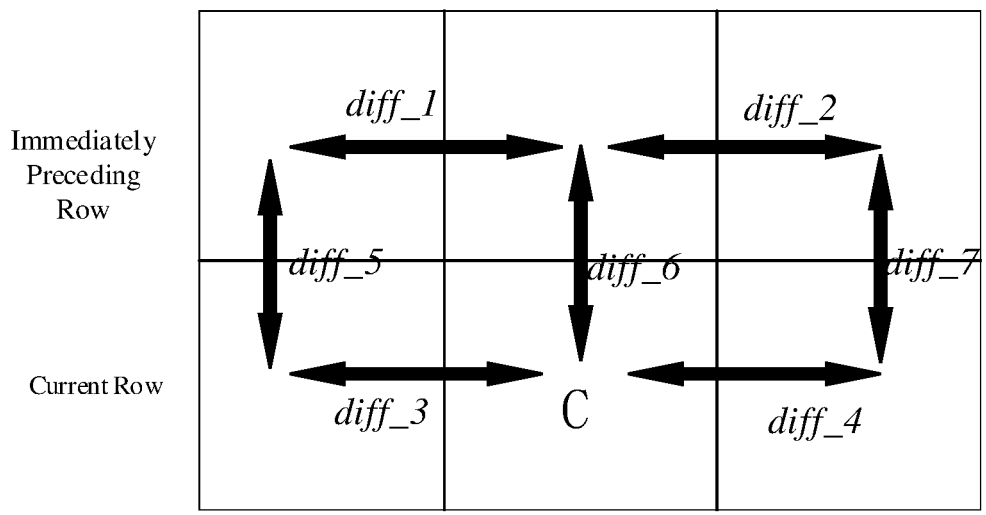
FIG. 5 is a schematic diagram illustrating gradient information of a pixel position of a current row according to an embodiment of the present disclosure.

For example, as shown in FIG. 5, the gradient information of each pixel in an image is obtained, and seven edge gradients namely edge_diff are calculated. Here, C is a position where a current pixel is located. Take the upper black edge region as an example, diff_1, diff_2, diff_3, and diff_4 are horizontal gradient values respectively, i.e., smoothness information in the horizontal direction which can be set for example as flat_val, and diff_5, diff_6, and diff_7 are the vertical gradient values, i.e., gradient information in the vertical direction which can be set for example as edge_val. Regarding the upper black edge region, if the current row Current_line is a potential bright line, the pixels on this line should satisfy that each of diff_5, diff_6, and diff_7 is greater than a first vertical gradient threshold which can be for example set as edge_diff_th, that is, there is a jump between two lines which are the current row and an immediately preceding row respectively, and that each of diff_1 and diff_2 is smaller than a first horizontal gradient threshold which can set for example as flat_th, which means that the line at the row which is immediately preceding the current row should be smooth. The number of pixels in each row which meet the above conditions is counted.

Figure 6:
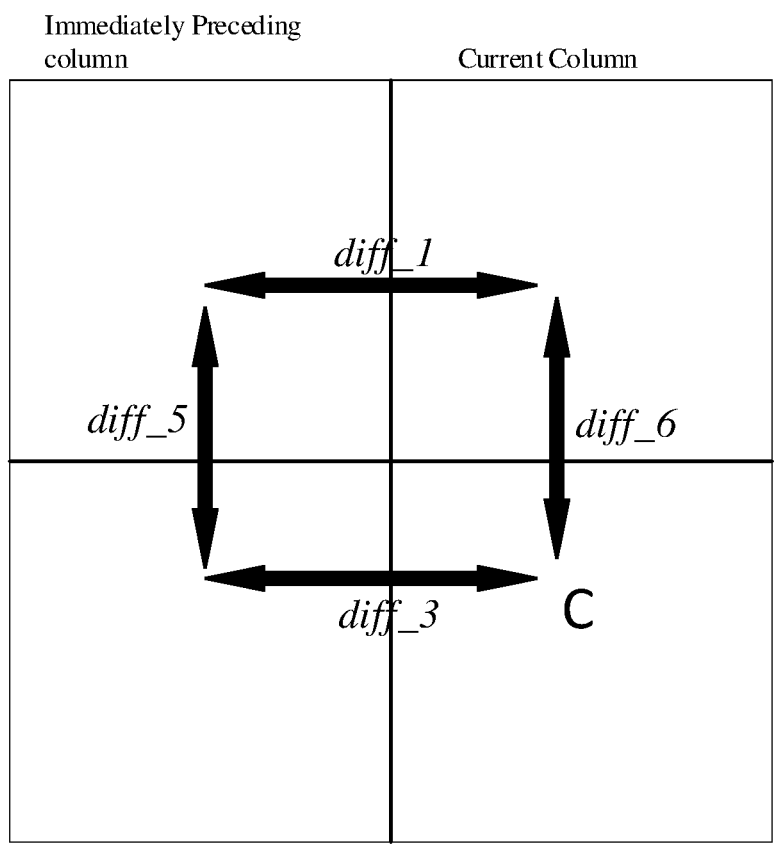
FIG. 6 is a schematic diagram illustrating gradient information of a pixel position of a current column according to an embodiment of the present disclosure.

For the left black edge region and the right black edge region, the amount of gradient values to be judged is reduced. As shown in FIG. 6, position C is the position of the current pixel, each of diff_1 and diff_3 is horizontal gradient information, that is, edge information edge_val in the horizontal direction, and each of diff_5 and diff_6 is a vertical gradient value, that is, smoothness information in the vertical direction which can be set for example as flat_val. Taking the left black edge region as an example, if the current column Current_line is a potential bright line, the pixels on this line should satisfy that each of diff_1 and diff_3 is greater than the second horizontal gradient threshold which can be set for example as edge_diff_th, that is, there is a jump between two lines which are the current column and an immediately preceding column, and that diff_5 is less than the second vertical gradient value which can be set for example as flat_th. The number of pixels in each column that meet the above conditions is counted.

Further, in the embodiment, for the upper black edge region, gradient information of the current row and gradient information of two rows which are adjacent to the current row respectively are processed by filtering to obtain an average gradient. When the average gradient is greater than a first edge threshold, the current row is determined as a first target gradient line that distinguishes the display region from the upper black edge region of the current frame of image. Alternatively, when the average gradient is greater than a second edge threshold, the current row is determined as a second target gradient line that distinguishes the display region from the upper black edge region of the current frame of image. Here, the first edge gradient value is greater than the second edge gradient value, that is, the first edge gradient value is set more strictly, and the second edge gradient information is set loosely. Setting dual thresholds can obtain more abundant information on a gradient line for the upper black edge region, and improve the robustness and flexibility of the method.

Similarly, for the lower black edge region, gradient information of a current row and gradient information of two rows which are adjacent to the current row respectively are processed by filtering to obtain an average gradient. When the average gradient is greater than the first edge threshold, the current row is determined as a first target gradient line that distinguishes the display region from the lower black edge region of the current frame of image. Alternatively, when the average gradient is greater than the second edge threshold, the current row is determined as a second target gradient line that distinguishes the display region from the lower black edge region of the current frame of image.

Similarly, for the left black edge region, gradient information of a current column and gradient information of two columns which are adjacent to the current column respectively are processed by filtering to obtain an average gradient. When the average gradient is greater than a first width threshold, the current column is determined as a first target gradient line that distinguishes the display region from the left black edge region of the current frame of image. Alternatively, when the average gradient is greater than a second width threshold, the current column is determined as a second target gradient line that distinguishes the display region from the left black edge region of the current frame of image. Here, the first width threshold is greater than the second width threshold, that is, the first width threshold is set more strictly, and the second width threshold is set more loosely, so that the gradient information of the left black edge region can be obtained. Setting dual threshold values can improve the robustness and flexibility of the method.

Similarly, for the right black edge region, gradient information of a current column and gradient information of two columns which are adjacent to the current column respectively are processed by filtering to obtain an average gradient. When the average gradient is greater than the first width threshold, the current column is determined as a first target gradient line that distinguishes the display region from the right black edge region of the current frame of image. Alternatively, when the average gradient is greater than the second width threshold, the current column is determined as a second target gradient line that distinguishes the display region from the right black edge region of the current frame of image. Setting double thresholds can improve robustness and flexibility of the method.

In the above, new gradient information is obtained by filtering the gradient information of the current row/column and rows/columns adjacent to the current row/column, that is, the new gradient information is compared with the threshold, and the optimal gradients of the upper, lower, left, and right black edge regions can be obtained.

Figure 7:
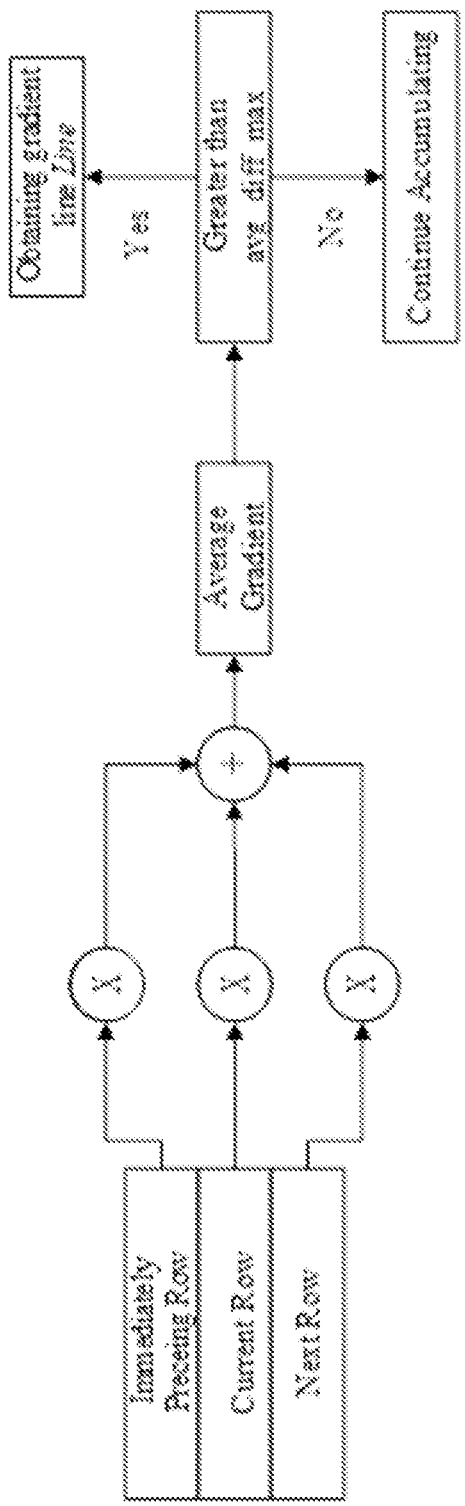
FIG. 7 is a schematic diagram illustrating a process of obtaining a target gradient line based on statistic gradient information according to an embodiment of the present disclosure.

The upper black edge region is taken as an example. Gradient information of the current row and gradient information of two rows which are adjacent to the current row respectively are filtered each time, to obtain new gradient information. As shown in FIG. 7, three lines i.e., lines at an immediately preceding row, a current row and a next row, are selected from top to bottom each time, and are low-pass filtered to obtain an average gradient avg_diff. When the average gradient avg_diff is greater than a first edge threshold which can be set for example as width/edge_th_div2, the current row is used as a first target gradient line between the display region and the upper black edge region. For example, the target gradient line is set as ro_bb_top_edge_posi2. When the average gradient avg_diff is greater than a second edge threshold which can be set for example as width/edge_th_div1, the current row is used as a second target gradient line between the display region and the upper black edge region which is set for example as ro_bb_top_edge_posi1. That is, when the average gradient is greater than the edge threshold value such as avg_diff_Max, it is determined that the gradient line is obtained. And when the threshold value cannot be met, the accumulation statistics are continued.

The bright pixel threshold line, the time-domain warning line and the gradient line between the display region and the black edge region of the current frame of image are obtained as described above. Further, these three types of lines are obtained using dual thresholds, that is, there are two bright pixel threshold lines, two time-domain warning lines and two target gradient lines for each of four black edge regions i.e., the upper, lower, left, and right black edge regions. Then, a software is used to select a final boundary bright line between each black edge region and the display region according to feedback information obtained.

The process of determining the boundary bright line between the display region of the current frame of image according to the positions of the bright pixel threshold line, the time-domain warning line, and the target gradient line are described in detail in the following. In the following embodiments, Cur in the corresponding figures represents a final selected result.

First, a preliminary selection is made based on existence information of a bright pixel threshold line, that is, valid information of the bright pixel threshold line output by an image scanning device. Specifically, in the embodiment, for the upper black edge region or the lower black edge region or the left black edge region or the right black edge region, when a first bright pixel threshold line exists, the first bright pixel threshold line is determined as a reference bright pixel threshold line. When the first bright pixel threshold line does not exist and a second bright pixel threshold line exists, the second bright pixel threshold line is determined as the reference bright pixel threshold line. When both the first bright pixel threshold line and the second bright pixel threshold line do not exist, a bright pixel threshold line of an immediately preceding video frame is determined as the reference bright pixel threshold line.

Here, it should be noted that among the set thresholds, the threshold condition corresponding to the first bright pixel threshold line is more stringent and more conservative than the threshold condition corresponding to the second bright pixel threshold line. That is to say, a value satisfies existence information which can be set for example as valid2 of the first bright pixel threshold line is selected preferentially. If valid2 is not satisfied and existence information valid1 of the second bright pixel threshold line is satisfied, the value corresponding to valid1 is selected. If both existence information valid is not satisfied, the result of an immediately preceding frame is selected. For the bright pixel threshold lines of the upper, lower, left, and right black edge regions, four candidate boundary bright lines are obtained. For example, they can be set as a line tmp_final_top_posi corresponding to the upper black edge region, a line tmp_final_bot_posi corresponding to the lower black edge region, a line tmp_final_lft_posi corresponding to the left black edge region, and a line tmp_final_rit_posi corresponding to the right black edge region.

In the embodiment, between each black edge region and the display region, there are the three types of lines mentioned above, i.e., the bright pixel threshold line, the time-domain warning line and the target gradient line. How to select a final bright line using existing information will be further explained in the following. In the following embodiment, the upper black edge region is taken as an example, LB represents the bright pixel threshold line, Edge represents the gradient line, and Motion represents the time-domain warning line.

In some embodiments, for the upper black edge region or the lower black edge region or the left black edge region or the right black edge region, when both the first time-domain warning line and the first target gradient line exist, if the position of the first target gradient line is adjacent to the position of the first time-domain warning line, the first target gradient line is determined as the boundary bright line between the display region and the black edge region of the current frame of image. For example, if there is little difference between the line Edge and the line Motion, because the line Edge is more reliable than the line Motion, the line Motion is updated to be at the position of the line Edge, that is the line Edge is the result of the selected boundary bright line.

In an embodiment, when both the first time-domain warning line and the first target gradient line exist, if the position of the reference bright pixel threshold line is adjacent to or the same as the position of the first target gradient line, one of the reference bright pixel threshold line and the first target gradient line which is at the position closer to the inside of the display region is determined as the boundary bright line. For example, if there is little difference between the line Lb and the line Edge, both the line Lb and the line Edge will become the line of the two which is closest to the inside of the image at the same time, that is, the selected result Cur is the line IN (Lb, Edge) of the line Lb and the line Edge which is closer to the inside of the image. If the line Lb and the line Edge are at the same position, the position of the line Edge is selected as the selected result.

In an embodiment, when both the first time-domain warning line and the first target gradient line exist, if the position of the first gradient line is at an outer side of the reference bright pixel threshold line, that is, the position of the first target gradient line is farther away from the inside of the image, the boundary bright line between the display region and the black edge region of the current video frame is determined according to the first target gradient line and the first time-domain warning line. For example, when the line Edge is located at an outer side of the line Lb, the line Lb is likely to be wrong at this time and is not desirable, so the line Motion needs to be introduced for determination.

In some embodiments, if the position of the first time-domain warning line is located at an outer side of the first target gradient line and the first target gradient line is not located at the image boundary, that is, is not located at zero position, the first target gradient line i.e., the line Edge is more reliable, the first target gradient line is determined as a boundary bright line between the display region and the black edge region of the current video frame, that is, the position of the line Edge is selected as the selection result. If the position of the first time-domain warning line is located at an inner side of the first target gradient line and the first target gradient line is located at the image boundary, and the line Edge is unreliable, and the result value of the immediately preceding frame is maintained, that is, the boundary bright line of the immediately preceding video frame is maintained as the boundary bright line of the current video frame. If the position of the first time-domain warning line is located at an inner side of the first target gradient line, that is, the first time-domain warning line is closer to the inside of the image, or in other words, there is a motion vector change in the first target gradient line at this time, the three types of lines are considered unreliable, and the boundary bright line output is zero, that is, the final selection result is 0.

In the embodiment, for the case where both the first time-domain warning line and the first target gradient line exist, if the position of the first target gradient line is located at an inner side of the reference bright pixel threshold line, the boundary bright line of the current video frame is determined according to information on the boundary bright line of the immediately preceding video frame of the current video frame and information on boundary bright line of the current video frame.

Specifically, in some embodiments, for the case in which the position of the target gradient line of the immediately preceding video frame is adjacent to the position of the first target gradient line of the current video frame, if the first time-domain warning line of the current video frame is located at an inner side of the first target gradient line, the first target gradient line is determined as the boundary bright line between the display region and the black edge region of the current video frame. For example, the line Motion is located at an inner side of the line Edge, it indicates that the current frame of image has captions but the captions do not change. At this time, the line Edge is selected as a final result.

In some embodiments, the target gradient line of the immediately preceding video frame is adjacent to the position of the first target gradient line of the current video frame, the first time-domain warning line of the current video frame is located at an outer side of the first target gradient line, and the time-domain warning line of the immediately preceding video frame is located at an inner side of the first time-domain warning line of the current video frame. In this case, if the immediately preceding video frame has captions which do not change or the immediately preceding video frame has no captions, the first target gradient line is determined as the boundary bright line between the display region and the black edge region of the current video frame. Alternatively, if the immediately preceding video frame has captions which change, the reference bright pixel threshold line is determined as the boundary bright line between the display region and the black edge region of the current video frame. For example, when the line Motion is located at an outer side of the line Edge, the position of the time-domain warning line such as the line Pre_Motion of the immediately preceding video frame and the position of the first time-domain warning line such as the line Motion of the current video frame are determined. When the line Pre_Motion is located at an inner side of the line Motion, if the immediately preceding frame has captions which do not change or the immediately preceding frame has no captions, the line Edge is selected as the boundary bright line, and if the immediately preceding frame has captions which change, the line Lb is selected as the boundary bright line.

In some embodiments, the gradient line of the immediately preceding video frame is adjacent to the position of the first target gradient line of the current video frame. If the first time-domain warning line of the current video frame is located at an outer side of the first target gradient line, and the time-domain warning line of the immediately preceding video frame is located at an outer side of the first time-domain warning line of the current video frame, the reference bright pixel threshold line is determined as the boundary bright line between the display region and the black edge region of the current video frame. For example, if the line Pre_Motion is located at the outer side of the line Motion, neither the line Edge nor the line Motion is reliable, and the line Lb is selected as the boundary bright line.

In other embodiments, the gradient line of the immediately preceding video frame is not adjacent to the position of the first target gradient line of the current video frame, i.e., Pre_Line is not adjacent to the line Edge. If the first time-domain warning line is located at an inner side of the first target gradient line, the first target gradient line is determined as the boundary bright line between the display region and the black edge region of the current video frame. For example, when the line Motion is located at an inner side of the line Edge, the line Edge is selected and it is considered that there are captions which are stationary in the current frame of image. If the first time-domain warning line is located at an outer side of the first target gradient line, the second target gradient line is searched for at an outer side of the first time-domain warning line. If the second target gradient line is found, the second target gradient line is determined as the boundary bright line between the display region and the black edge region of the current video frame. For example, when Motion is located at an outer side of the line Edge, a new gradient line New_Edge, that is the second target gradient line Edge_Line1, is searched for at an outer side of the line Motion. When found, the second target gradient line Edge_Line1 is selected as the final detection result.

In some embodiments, there may be a case the first time-domain warning line is located at an outer side of the first target gradient line, and the second target gradient line is not found. In this case, if the time-domain warning line of the immediately preceding video frame is located at an outer side of the second time-domain warning line, a line of the reference bright pixel threshold line and the time-domain warning line of the immediately preceding video frame, which is closer to the outside of the display region, is determined as the boundary bright line. If the time-domain warning line of the immediately preceding video frame is located at an inner side of the second time-domain warning line, when the immediately preceding video frame has captions which do not change or has no captions, the first target gradient line is determined as the boundary bright line, or when the immediately preceding video frame has captions which change, a reference zero threshold line is determined as the boundary bright line. For example, if the second target gradient line is not found, the position relationship between the line Pre_Motion and the line Motion is determined. If Pre_Motion is located at an outer side of Motion, a line of the line Lb and the line Pre_Motion, which is closer to the outside, is determined as the final detection result. If Pre_motion is located at an inner side of Motion, there are two cases as follows. In one case, the immediately preceding video frame has captions which do not change or has no captions, the line Edge is selected as the final selected boundary bright line; in the other case, the immediately preceding video frame has captions which change, the line Lb is selected as the final boundary bright line.

In other embodiments, for the upper black edge region or the lower black edge region or the left black edge region or the right black edge region, neither the first time-domain warning line nor the first target gradient line exists, and there is only the bright pixel threshold line as a reference at this time. If both the first bright pixel threshold line and the second bright pixel threshold line exist, a line of the first bright pixel threshold line and the second bright pixel threshold line, which is located at a position closer to the outside of the display region, is determined as the boundary bright line. If the first bright pixel threshold line does not exist and the second bright pixel threshold line exists, the second bright pixel threshold line is determined as the boundary bright line. Further, if the first bright pixel threshold line exists and the second bright pixel threshold line does not exist, the first bright pixel threshold line is determined as the boundary bright line. If neither the first bright pixel threshold line nor the second bright pixel threshold line exists, an image edge is determined as the boundary bright line, that is, the boundary of the image is not processed to avoid errors.

For example, if both the line Lb1 and the line Lb2 exist, a line of the two, which is closer to the outside of the image, is selected as the final selected boundary bright line. If only the line Lb1 exists, the line Lb1 is selected as the final selected boundary bright line. If only the line Lb2 exists, the line Lb2 is selected as the final selected boundary bright line. If neither the line Lb1 nor the line Lb2 exists, it bounces to the image edge directly, that is, the image edge will be selected as the result to avoid errors.

In some embodiments, for the upper black edge region or the lower black edge region or the left black edge region or the right black edge region, the first time-domain warning line does not exist and the first target gradient line exists. If the position of the reference bright pixel threshold line is adjacent to the position of the first target gradient line, a line of the reference bright pixel threshold line and the first target gradient line, which is closer to the inside of the display region, is determined as the boundary bright line. If the reference bright pixel threshold line is located at an outer side of the first target gradient line, the first target gradient line is determined as the boundary bright line. If the reference bright pixel threshold line is located at an inner side of the first target gradient line, an image edge line is determined as the boundary bright line when a second target gradient line exists at an outer side of the first target gradient line, or the first target gradient line is determined as a boundary bright line when there is no there is no second target gradient line at the outer side of the first target gradient line.

For example, the line top_motion_posi2 does not exist, and the line top_edge_posi2 exists. At this time, the line Lb and the line Edge are available for reference. If the line Lb is close to the line Edge, the innermost line of the line Lb and the line Edge is selected as the selection result Cur. If the line Lb is at an outer side of the line Edge, the line Edge is used as the selection result Cur. If the line Lb is at an inner side of the line Edge, it is also necessary to determine whether there is a new time-domain warning line New_Motion that is a second time-domain warning line such as motion_posi1 at the outer side of the line Edge. If the second time-domain warning line motion_posi1 exists, the second time-domain warning line motion_posi1 is used as the current result Cur, or for the sake of conservativeness, it bounce to the image edge directly, that is, the edge of the image is the final boundary bright line. If the second time-domain warning line motion_posi1 does not exist, the line Edge is selected as the final result Cur.

In other embodiments, for the upper black edge region or the lower black edge region or the left black edge region or the right black edge region, when the first time-domain warning line exists and the first target gradient line does not exist, a new gradient line is searched for outward from the position of a line, which is closer to the inside of the display region, of the first time-domain warning and the reference bright pixel threshold line, the new gradient line being the second target gradient line. In other words, to reduce the judgment conditions, there are the following two situations.

In one case, a new gradient line is found at the outer side of the position of a line, which is closer to the inside of the display region, of the first time-domain warning and the reference bright pixel threshold line, the new gradient line being the second target gradient line and the second target gradient line being adjacent to the position of the first time-domain warning line. If the reference bright pixel threshold line is adjacent to the second target gradient line, the line which is closer to the inside of the display region in the reference bright pixel threshold line and the second target gradient line is determined as the boundary bright line. Or if the first time-domain warning line is located at an inner side of the second target gradient line, the second target gradient line is determined as the boundary bright line when the second target gradient line is not at the image edge, or the boundary bright line of the immediately preceding video frame is determined as the boundary bright line of the current video frame when the second target gradient line is at the image edge. Or if the first time-domain warning line is located at an outer side of the second target gradient line, the image boundary line of the current video frame is determined as the boundary bright line.

For example, when the first time-domain warning line i.e. line top_motion_posi2 exists, and the first gradient line i.e. line top_edge_posi2 does not exist, the line Lb and the line Motion are available for reference at this time. First, it determines whether there is a new gradient line New_Edge at an outer side of the line, which is closer to the inside, of the line Motion and the line Lb, the new gradient line New_Edge being the second target gradient line which is set for example as top_edge_posi1. If the second target gradient line top_edge_posi1 is found, the second target gradient line top_edge_posi1 is preprocessed. when the line New_Edge is adjacent to the line Motion, the line Motion becomes the line New_Edge. When the line Lb is adjacent to the line New_Edge, the innermost line of the line Lb and the line New_Edge is selected as the current result Cur. When the line Motion is located at an inner side of the line New_Edge, the line New_Edge is selected as the current result Cur when the line New_Edge is not at the image boundary, or the immediately preceding result is selected as the current result Cur when the line New_Edge is at the image edge. When the line Motion is located at an outer side of the line New_Edge, it indicates that these three types of lines are unreliable, and they bounce directly to the image boundary.

Alternatively, in another case, when a new gradient line is not found at the outer side of the position of a line, which is closer to the inside of the display region, of the first time-domain warning line and the reference bright pixel threshold line, that is, the second target gradient line is not found, the second target gradient line is searched for outward from the position of a line, which is farther away from the display region, of the first time-domain warning line and the reference bright pixel threshold line. If the second target gradient line is found, the second target gradient line is determined as the boundary bright line. Or if the second target gradient line is not found and the reference bright pixel threshold line is located at the outer side of the first time-domain warning line, the reference bright pixel threshold line is determined as the boundary bright line. Or if the second target gradient line is not found and the reference bright pixel threshold line is located at the inner side of the first time-domain warning line, the image boundary line of the current video frame is determined as the boundary bright line.

For example, if a new gradient line i.e. line New_Edge is not found at the outer side of the position of a line, which is closer to the inside of the display region, of the first time-domain warning line and the reference bright pixel threshold line, it determines whether there is a new gradient line i.e. line New_Edge is located at outside of a line, which is closer to the outside of the display region, of the line Motion and the line Lb, the new gradient line being the second target gradient line top_edge_posi1. If the new gradient line is found, the line New_Edge is selected as the selection result Cur. If the new gradient line is not found, there are two cases as follows. In one case, if line the Lb is at an outer side of the line Motion, the line Lb is selected as the current result Cur. In another case, if the line Lb is at an inner side of the line Motion, it will bounce directly to the image boundary to avoid errors.

In summary, the method for detecting a display region of a video image in real time according to the embodiment of the present disclosure obtains the bright pixel threshold line, time-domain warning line, and target gradient line for each of the upper, lower, left, and right black edge regions and then selects the final detection result using a decision-making method. Compared to the process of determining a boundary bright line only by the bright pixel threshold, the method in the present disclosure comprehensively considers the information of the three types of boundary lines without only depending on the bright pixel threshold, and makes the detection result more accurate and stable through the gradient information and motion information. Further, for the case in which the boundary of an image is not smooth enough, the detection result is more stable by combination of feedback information. In addition, by setting dual thresholds, one of which is set more strictly and the other one is set more loosely, more abundant information can be obtained so as to further improve the robustness and feasibility of the method.

In an embodiment according to a second aspect of the present disclosure, an apparatus for detecting a display region of a video image in real time is described with reference to the accompanying drawings.

Figure 8:
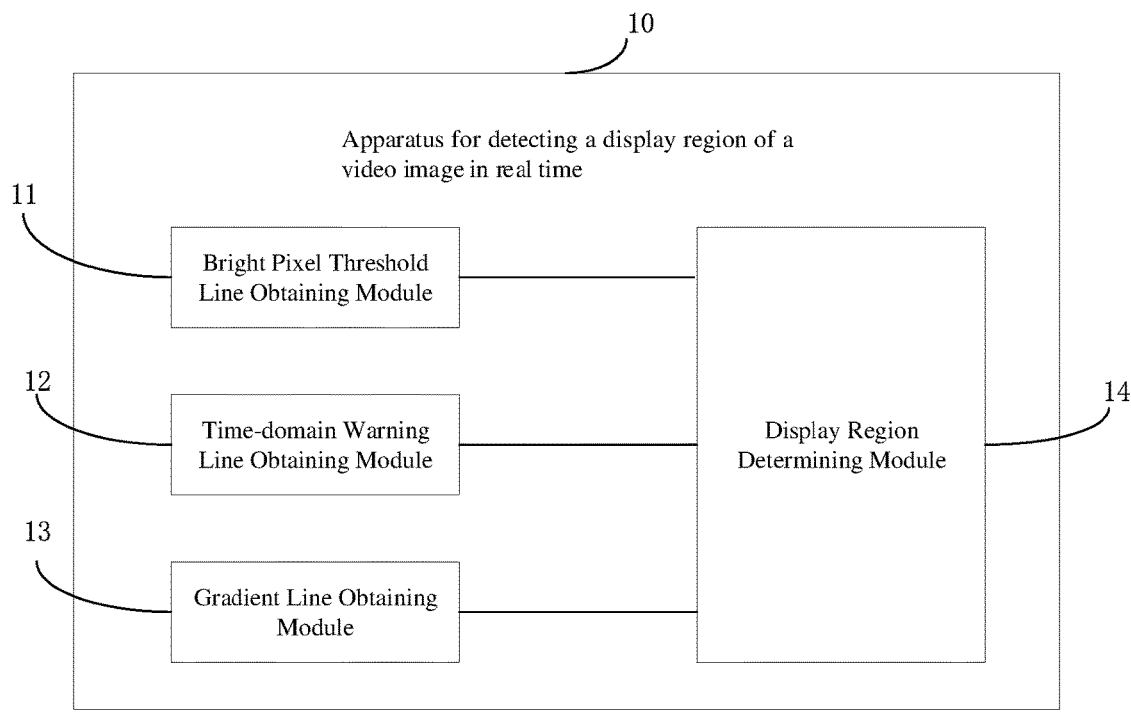
FIG. 8 is a block diagram of an apparatus for detecting a display region of a video image in real time according to an embodiment of the present disclosure.

FIG. 8 is a block diagram of an apparatus for detecting a display region of a video image in real time according to an embodiment of the present disclosure. As shown in FIG. 8, an apparatus 10 of the embodiment of the present disclosure includes a bright pixel threshold line obtaining module 11, a time-domain warning line obtaining module 12, a gradient line obtaining module 13 and a display region determining module 14.

Here, the bright pixel threshold line obtaining module 11 is configured to obtain a pixel value of each pixel in a current frame of image, and determine a bright pixel threshold line that distinguishes a display region from a black edge region of the current frame of image according to the pixel value of each pixel. The time-domain warning line obtaining module 12 is configured to obtain time-domain motion statistic values of pixels of the current frame of image relative to the corresponding pixels of an immediately preceding frame of image, and to determine a time-domain warning line that distinguishes the display region from the black edge region of the current frame of image according to the time-domain motion statistic values of each row and each column of pixels of the current frame of image The gradient line obtaining module 13 is configured to obtain gradient information of the pixels in each row and each column of the current frame of image, and determine a target gradient line that distinguishes the display region from the black edge region of the current frame of image according to the gradient information of the pixels in each row and each column. The display region determining module 14 is configured to determine a boundary bright line between the display region and the black edge region of the current frame of image according to positions of the bright pixel threshold line, the time-domain warning line and the target gradient line and determine the display region of the current frame of image according to the boundary bright line.

For the process of obtaining the bright pixel threshold line, the time-domain warning line and the target gradient line for the upper, lower, left, and right black edge regions, and the process of making decisions based on these three types of lines to obtain the final boundary bright line position, reference is made to the description of any of the above embodiments.

The apparatus 10 for detecting a display region of a video image in real time according to an embodiment of the present disclosure comprehensively considers the bright pixel threshold, the time-domain motion change, and the difference of the image edges based on the bright pixel threshold line obtaining module 11, the time-domain warning line obtaining module 12, and the gradient line obtaining module 13 to select a boundary bright line of a display region of a current frame of image. Compared to determining a boundary bright line only by the bright pixel threshold, the detection result is more accurate and stable. Further, for the case in which the boundary of frame of image is not smooth enough, the detection result of the display region is more stable by combination of these three types of lines based on feedback information. In addition, it can deal with a video code stream with uneven light and dark distribution effectively. Therefore, a stable boundary bright line is obtained, and the video image algorithm and the final video image quality are improved.

Figure 9:
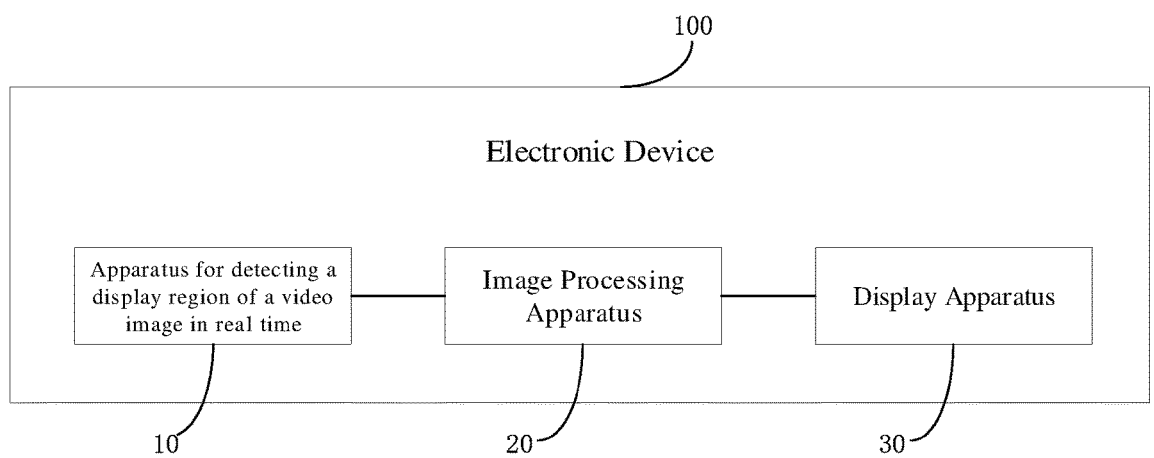
FIG. 9 is a block diagram of an electronic device according to an embodiment of the present disclosure.

As shown in FIG. 9, an electronic device 100 of an embodiment of the present disclosure includes the apparatus 10 for detecting a display region of a video image in real time according to the above embodiment, an image processing apparatus 20, and a display apparatus 30. The apparatus 10 for detecting a display region of a video image in real time is configured to determine a display region of a video image, and the specific implementation process can refer to the description of the above embodiment. The image processing apparatus 20 is configured to process the display region of the video image, such as via motion estimation, etc. The display apparatus 30 is connected to the image processing apparatus 20 and is configured to display a processed video image.

In the embodiment, the electronic device 100 may include some devices having the functions of image processing and image display, including such as a television, a projector, and a computer.

The electronic device 100 according to the embodiment of the present disclosure selects a boundary bright line for the display region of a current frame of image by adopting the apparatus 10 for detecting a display region of a video image in real time in any of the above embodiments and comprehensively considering the bright pixel threshold, the motion vector change and the difference of the image edges. Compared to determining a boundary bright line only by the bright pixel threshold, the detection result is more accurate and stable. Further, for the case in which the boundary of frame of image is not smooth enough, the detection result of the display region is more stable by combination of these three types of lines based on feedback information. In addition, it can deal with a video code stream with uneven light and dark distribution effectively. Therefore, a stable boundary bright line is obtained, and the video image algorithm and the final video image quality are improved.

In the illustration of this description, an illustration with reference to the terms "one embodiment", "some embodiments", "illustrative embodiments", "an example", "a particular example" or "some examples" and so on mean that a particular feature, structure, material, or characteristic described in connection with the embodiment(s) or example(s) is included in at least one embodiment or example of the present disclosure. In this description, the exemplary expressions of the above terms do not necessarily specify the same embodiments or examples.

Although embodiments of the present disclosure have been shown and described, it will be understood by those skilled in the art that various changes, modifications, alternations and variations may be made to these embodiments without departing from the principles and spirit of the present disclosure, the scope of which is defined by the claims and their equivalents.

The invention claimed is:

1. A method for detecting a display region of a video image in real time, comprising:

obtaining a pixel value of each pixel in a current frame of image, and determining a bright pixel threshold line that distinguishes a display region from a black edge region of the current frame of image according to the pixel value of each pixel;

obtaining time-domain motion statistic values of pixels of the current frame of image relative to corresponding pixels of an immediately preceding frame of image, and determining a time-domain warning line that distinguishes the display region from the black edge region of the current frame of image according to the time-domain motion statistic values of each row and each column of pixels of the current frame of image;

obtaining gradient information of each row and each column of pixels in the current frame of image, and determining a target gradient line that distinguishes the display region from the black edge region of the current frame of image according to the gradient information of each row and each column of pixels;

determining a boundary bright line between the display region and the black edge region of the current frame of image according to positions of the bright pixel threshold line, the time-domain warning line and the target gradient line; and determining the display region of the current frame of image according to the boundary bright line.

2. The method for detecting a display region of a video image in real time according to claim 1, wherein said obtaining a pixel value of each pixel in a current frame of image, and determining a bright pixel threshold line that distinguishes a display region from a black edge region of the current frame of image according to the pixel value of each pixel, comprises:

reading a pixel value of each pixel in each row of the current frame of image sequentially from top to bottom, counting the number of bright pixels in each row of pixels, and determining a row in which the number of bright pixels exceeds a first preset number threshold as the bright pixel threshold line that distinguishes the display region from an upper black edge region of the current frame of image, wherein if the pixel value is greater than a bright pixel threshold, a corresponding pixel is determined as a bright pixel;

reading a pixel value of each pixel in each row of pixels in the current frame of image downward from the bright pixel threshold line that distinguishes the display region from the upper black edge region of the current frame of image, and determining, when the number of bright pixels in a current row of pixels exceeds the first preset number threshold and the number of bright pixels between the current row and the bright pixel threshold line that distinguishes the display region from the upper black edge region of the current frame of image exceeds a first bright pixel number threshold, the current row as a bright pixel threshold line that distinguishes the display region from a lower black edge region of the current frame of image;

reading a pixel value of each pixel in each column of pixels in the current frame of image sequentially from left to right, counting the number of bright pixels in each column of pixels, and determining a column in which the number of bright pixels exceeds a second preset number threshold as a bright pixel threshold line that distinguishes the display region from a left black edge region of the current frame of image, wherein if the pixel value is greater than the bright pixel threshold, a corresponding pixel is determined as a bright pixel; and reading a pixel value of each pixel in each column of pixels in the current frame of image towards the right from the bright pixel threshold line that distinguishes the display region from the left black edge region of the current frame of image, and determining, when the number of bright pixels of a current column of pixels exceeds the second preset number threshold and the number of bright pixels between the current column and the bright pixel threshold line that distinguishes the display region from the left black edge region of the current frame of image exceeds a second bright pixel number threshold, the current column as a bright pixel threshold line that distinguishes the display region from the right black edge region of the current frame of image.

3. The method for detecting a display region of a video image in real time according to claim 2, wherein said reading a pixel value of each pixel in each row of the current frame of image sequentially from top to bottom, counting the number of bright pixels in each row of pixels, and determining a row in which the number of bright pixels exceeds a first preset number threshold as the bright pixel threshold line that distinguishes the display region from an upper black edge region of the current frame of image, wherein if the pixel value being greater than a bright pixel threshold, a corresponding pixel being determined as a bright pixel, comprises:

reading a pixel value of each pixel in each row of pixels in the current frame of image sequentially from top to bottom;

determining when the pixel value is greater than a first bright pixel sub-threshold, a corresponding pixel as a bright pixel, counting the number of bright pixels in each row of pixels, and determining the row in which the number of bright pixels exceeds the first preset number threshold, as a first bright pixel threshold line that distinguishes the display region from the upper black edge region of the current frame of image, or determining, when the pixel value is greater than a second bright pixel sub-threshold, a corresponding pixel as a bright pixel, counting the number of bright pixels in each row of pixels, and determining a row in which the number of bright pixels exceeds the second preset number threshold as a second bright pixel threshold line that distinguishes the display region from the upper black edge region of the current frame of image, wherein the first bright pixel sub-threshold value is greater than the second bright pixel sub-threshold value.

4. The method for detecting a display region of a video image in real time according to claim 2, wherein said reading a pixel value of each pixel in each row of pixels in the current frame of image downward from the bright pixel threshold line that distinguishes the display region from the upper black edge region of the current frame of image, and determining, when the number of bright pixels in a current row of pixels exceeds the first preset number threshold and the number of bright pixels between the current row and the bright pixel threshold line that distinguishes the display region from the upper black edge region of the current frame of image exceeds a first bright pixel number threshold, the current row as a bright pixel threshold line that distinguishes the display region from a lower black edge region of the current frame of image, comprises:

reading a pixel value of each pixel in each row of pixels in the current frame of image sequentially downwards from the bright pixel threshold line that distinguishes the display region from the upper black edge region of the current frame of image;

determining, when the pixel value is greater than a first bright pixel sub-threshold, a corresponding pixel as a bright pixel, counting the number of bright pixels in each row of pixels, and determining the row in which the number of bright pixels exceeds the first preset number threshold as a first bright pixel threshold line that distinguishes the display region from the lower black edge region of the current frame of image; or determining, when the pixel value is greater than a second bright pixel sub-threshold, a corresponding pixel as a bright pixel, counting the number of bright pixels in each row of pixels, and determining a row in which the number of bright pixels exceeds the second preset number threshold as a second bright pixel threshold line that distinguish the display region from the lower black edge region of the current frame of image, wherein the first bright pixel sub-threshold is greater than the second bright pixel sub-threshold.

5. The method for detecting a display region of a video image in real time according to claim 2, wherein said reading a pixel value of each pixel in each column of pixels in the current frame of image sequentially from left to right, counting the number of bright pixels in each column of pixels, and determining a column in which the number of bright pixels exceeds a second preset number threshold as a bright pixel threshold line that distinguishes the display region from a left black edge region of the current frame of image, wherein if the pixel value is greater than the bright pixel threshold, a corresponding pixel is determined as a bright pixel, comprises:

obtaining a pixel value of each pixel in each column of pixels in the current frame of image sequentially from left to right;

determining, when the pixel value is greater than a third bright pixel sub-threshold, the corresponding pixel as a bright pixel, counting the number of bright pixels in each column of pixels, and determining the column in which the number of bright pixels exceeds a third preset number threshold as a first bright pixel threshold line that distinguishes the display region from the left black edge region of the current frame of image, and determining, when the pixel value is greater than a fourth bright pixel sub-threshold, the corresponding pixel as a bright pixel, counting the number of bright pixels in each column of pixels, and determining the column in which the number of bright pixels exceeds a fourth preset number threshold as a second bright pixel threshold line that distinguishes the display region from the left black edge region of the current frame of image, wherein, the third bright pixel sub-threshold value is greater than the fourth bright pixel sub-threshold.

6. The method for detecting a display region of a video image in real time according to claim 2, wherein said reading a pixel value of each pixel in each column of pixels in the current frame of image towards the right from the bright pixel threshold line that distinguishes the display region from the left black edge region of the current frame of image, and determining, when the number of bright pixels of a current column of pixels exceeds the second preset number threshold and the number of bright pixels between the current column and the bright pixel threshold line that distinguishes the display region from the left black edge region of the current frame of image exceeds a second bright pixel number threshold, the current column as a bright pixel threshold line that distinguishes the display region from the right black edge region of the current frame of image, comprises:

reading a pixel value of each pixel in each column of pixels in the current frame of image sequentially towards the right from the bright pixel threshold line that distinguishes the display region from the left black edge region of the current frame of image, determining, when the pixel value is greater than a third bright pixel sub-threshold, a corresponding pixel as a bright pixel, counting the number of bright pixels in each column of pixels, and determining the column in which the number of bright pixels exceeds a third preset number threshold as a first bright pixel threshold line that distinguishes the display region from the right black edge region of the current frame of image; or determining, when the pixel value is greater than a fourth bright pixel sub-threshold, the corresponding pixel as a bright pixel, counting the number of bright pixels in each column of pixels, and determining the column in which the number of bright pixels exceeds a fourth preset number threshold as a second bright pixel threshold line that distinguishes the display region from the right black edge region of the current frame of image, wherein the third bright pixel sub-threshold is greater than the fourth bright pixel sub-threshold.

7. The method for detecting a display region of a video image in real time according to claim 1, wherein said obtaining time-domain motion statistic values of pixels of the current frame of image relative to corresponding pixels of an immediately preceding frame of image, comprises:

obtaining a pixel value $I'_t(x, y)$ of a pixel at a position (x, y) in the current frame of image, and obtaining a pixel value $I'_{t-1}(x, y)$ of a pixel at the same position (x, y) in the immediately preceding frame of image;

calculating a pixel difference value between $I'_t(x, y)$ and $I'_{t-1}(x, y)$;

determining, when the pixel difference value is greater than a first pixel motion threshold, a time-domain motion difference value of the pixel at the position (x, y) as a first time-domain motion difference value, and determining, when the pixel difference value is less than or equal to the first pixel motion threshold and greater than a second pixel motion threshold, the time-domain motion difference value of the pixel at position (x, y) as a second time-domain motion difference value, wherein the first time-domain motion difference value is greater than the second time-domain motion difference value; and calculating a sum of the time-domain motion difference values of pixels in each row of pixels in the current frame of image to obtain a time-domain motion statistic value for each row, and calculating a sum of the time-domain motion difference values of pixels in each column of pixels in the current frame of image to obtain a time-domain motion statistic value for each column.

8. The method for detecting a display region of a video image in real time according to claim 7, wherein said determining a time-domain warning line that distinguishes the display region from the black edge region of the current frame of image according to the time-domain motion statistic values of each row and each column of pixels of the current frame of image, comprises:

accumulating the time-domain motion statistic values of respective rows of the current frame of image sequentially from top to bottom, and determining when a total accumulated value of the time-domain motion statistic value of the current row and the time-domain motion statistic values of all preceding rows is greater than a first time-domain motion accumulation threshold, the current row as a time-domain warning line that distinguishes the display region from the upper black edge region of the current frame of image;

accumulating the time-domain motion statistic values of respective rows of the current frame of image sequentially from bottom to top, and determining when a total accumulated value of the time-domain motion statistic value of the current row and the time-domain motion statistic values of all preceding rows is greater than the first time-domain motion accumulation threshold, the current row as a time-domain warning line that distinguishes the display region from the lower black edge region of the current frame of image;

accumulating the time-domain motion statistic values of respective columns of the current frame of image sequentially from left to right, and determining when a total accumulated value of the time-domain motion statistic value of the current column and the time-domain motion statistic values of all preceding columns is greater than a second time-domain motion accumulation threshold, the current column as a time-domain warning line that distinguishes the display region from the left black edge region of the current frame of image; and accumulating the time-domain motion statistic values of respective columns of the current frame of image sequentially from right to left, and determining when a total accumulated value of the time-domain motion statistic value of the current column and the time-domain motion statistic values of all preceding columns is greater than the second time-domain motion accumulation threshold, the current column as a time-domain warning line that distinguishes the display region from the right black edge region of the current frame of image.

9. The method for detecting a display region of a video image in real time according to claim 8, wherein said accumulating the time-domain motion vector statistic values of respective rows of the current frame of image sequentially from top to bottom, and determining when a total accumulated value of the time-domain motion statistic value of the current row and the time-domain motion statistic values of all preceding rows is greater than a first time-domain motion accumulation threshold, the current row as a time-domain warning line that distinguishes the display region from the upper black edge region of the current frame of image, comprises:

accumulating the time-domain motion statistic values of respective rows of the current frame of image sequentially from top to bottom;

determining, when a total accumulated value of the time-domain motion statistic value of the current row and the time-domain motion statistic values of all preceding rows is greater than a first time-domain motion accumulation sub-threshold, the current row as a first time-domain warning line that distinguishes the display region from the upper black edge region of the current frame of image; or determining, when the total accumulated value of the time-domain motion statistic value of the current row and the time-domain motion statistic values of all preceding rows is greater than a second time-domain motion accumulation sub-threshold, the current row as a second time-domain warning line that distinguishes the display region from the upper black edge region of the current frame of image;

wherein the first time-domain motion accumulation sub-threshold is greater than the second time-domain motion accumulation sub-threshold.

10. The method for detecting a display region of a video image in real time according to claim 8, wherein said accumulating the time-domain motion statistic values of respective rows of the current frame of image sequentially from bottom to top, and determining when a total accumulated value of the time-domain motion statistic value of the current row and the time-domain motion statistic values of all preceding rows is greater than the first time-domain motion accumulation threshold, the current row as a time-domain warning line that distinguishes the display region from the lower black edge region of the current frame of image, comprises:

accumulating the time-domain motion statistic values of respective rows of the current frame of image sequentially from bottom to top;

determining, when a total accumulated value of the time-domain motion statistic value of the current row and the time-domain motion statistic values of all preceding rows is greater than a first time-domain motion accumulation sub-threshold, the current row as a first time-domain warning line that distinguishes the display region from the lower black edge region of the current frame of image; or determining, when the total accumulated value of the time-domain motion statistic value of the current row and the time-domain motion statistic values of all preceding rows is greater than a second time-domain motion accumulation sub-threshold, the current row as a second time-domain warning line that distinguishes the display region from the lower black edge region of the current frame of image, wherein, the first time-domain motion accumulation sub-threshold is greater than the second time-domain motion accumulation sub-threshold.

11. The method for detecting a display region of a video image in real time according to claim 8, wherein said accumulating the time-domain motion statistic values of respective columns of the current frame of image sequentially from left to right, and determining when a total accumulated value of the time-domain motion statistic value of the current column and the time-domain motion statistic values of all preceding columns is greater than a second time-domain motion accumulation threshold, the current column as a time-domain warning line that distinguishes the display region from the left black edge region of the current frame of image, comprises:

accumulating total values of time-domain motion statistic values of respective pixel blocks are sequentially from left to right, each pixel block comprising n columns of pixels, where n is an integer greater than 1;

accumulating, when a total value of the time-domain motion statistic values obtained at a current pixel block is greater than a block motion threshold, the time-domain motion statistic values of respective columns of pixels in the current pixel block sequentially from left to right;

determining, when a total accumulated value of the time-domain motion statistic value of the current column of pixels and the time-domain motion statistic values of all preceding columns in the current pixel block is greater than a third time-domain motion accumulation sub-threshold, the current column as a first time-domain warning line that distinguishes the display region from the left black edge region of the current frame of image, or determining, when the total accumulated value of the time-domain motion statistic value of the current column of pixels and the time-domain motion statistic values of all preceding columns in the current pixel block is greater than a fourth time-domain motion accumulation sub-threshold, the current column as a second time-domain warning line that distinguishes the display region from the left black edge region of the current frame of image, wherein the fourth time-domain motion accumulation sub-threshold is less than the third time-domain motion accumulation sub-threshold.

12. The method for detecting a display region of a video image in real time according to claim 8, wherein said accumulating the time-domain motion statistic values of respective columns of the current frame of image sequentially from right to left, and determining when a total accumulated value of the time-domain motion statistic value of the current column and the time-domain motion statistic values of all preceding columns is greater than the second time-domain motion accumulation threshold, the current column as a time-domain warning line that distinguishes the display region from the right black edge region of the current frame of image, comprises:

accumulating total values of the time-domain motion statistic values of respective pixel blocks sequentially from right to left, wherein each pixel block comprises n columns of pixels, where n is an integer greater than 1;

accumulating, when a total value of the time-domain motion statistic values obtained at the current pixel block is greater than a block motion threshold, the time-domain motion statistic values of respective columns of pixels in the current pixel block sequentially from right to left;

determining, when a total accumulated value of the time-domain motion statistic value of the current column of pixels and the time-domain motion statistic values of all preceding columns in the current pixel block is greater than a third time-domain motion accumulation sub-threshold, the current column as a first time-domain warning line that distinguishes the display region from the right black edge region of the current frame of image; or determining, when the total accumulated value of the time-domain motion statistic value of the current column of pixels and the time-domain motion statistic values of all preceding columns in the current pixel block is greater than a fourth time-domain motion accumulation sub-threshold, the current column as a second time-domain warning line that distinguishes the display region from the right black edge region of the current frame of image, wherein the fourth time-domain motion accumulation sub-threshold is less than the third time-domain motion accumulation sub-threshold.

13. The method for detecting a display region of a video image in real time according to claim 12, wherein said obtaining gradient information of each row and each column of pixels in the current frame of image, and determining a target gradient line that distinguishes the display region from the black edge region of the current frame of image according to the gradient information of each row and each column of pixels, comprises:

obtaining a horizontal gradient value and vertical gradient value of each pixel in each row sequentially from top to bottom, determining when the horizontal gradient value of the pixel is less than a first horizontal gradient threshold and the vertical gradient value of the pixel is greater than a first vertical gradient threshold, the pixel as a bright pixel, and counting the number of bright pixels included in a current row;

obtaining a horizontal gradient value and vertical gradient value of each pixel in each row sequentially from bottom to top, determining when the horizontal gradient value of the pixel is less than the first horizontal gradient threshold and the vertical gradient value of the pixel is greater than the first vertical gradient threshold, the pixel as a bright pixel, and counting the number of bright pixels included in the current row;

obtaining a horizontal gradient value and vertical gradient value of each pixel in each column sequentially from left to right, determining when the horizontal gradient value of the pixel is greater than a second horizontal gradient threshold and the vertical gradient value of the current pixel is less than a second vertical gradient threshold, the pixel as a bright pixel, and counting the number of bright pixels included the current column; and obtaining a horizontal gradient value and vertical gradient value of each pixel in each column sequentially from right to left, determining when the horizontal gradient value of the pixel is greater than the second horizontal gradient threshold and the vertical gradient value of the pixel is less than the second vertical gradient threshold, the pixel as a bright pixel, and counting the number of bright pixels included in the current column.

14. The method for detecting a display region of a video image in real time according to claim 13, wherein said obtaining gradient information of each row and each column of pixels in the current frame of image, and determining a target gradient line that distinguishes the display region from the black edge region of the current frame of image according to the gradient information of each row and each column of pixels, comprises:

for an upper black edge region, processing gradient information of a current row and gradient information of two rows which are adjacent to the current row respectively by filtering to obtain an average gradient, and determining when the average gradient is greater than a first edge threshold, the current row as a first target gradient line that distinguishes the display region from the upper black edge region of the current frame of image, or determining when the average gradient is greater than a second edge threshold, the current row as a second target gradient line that distinguishes the display region from the upper black edge region of the current frame of image, wherein the first edge gradient value is greater than the second edge gradient value;

for a lower black edge region, processing gradient information of a current row and gradient information of two rows which are adjacent to the current row respectively by filtering to obtain an average gradient, determining when the average gradient is greater than the first edge threshold, the current row as a first target gradient line that distinguishes the display region from the lower black edge region of the current frame of image, or determining when the average gradient is greater than the second edge threshold, the current row as a second target gradient line that distinguishes the display region from the lower black edge region of the current frame of image;

for a left black edge region, processing gradient information of a current column and gradient information of two columns which are adjacent to the current column respectively by filtering to obtain an average gradient, determining when the average gradient is greater than a first width threshold, the current column as a first target gradient line that distinguishes the display region from the left black edge region of the current frame of image, or determining when the average gradient is greater than a second width threshold, the current column as a second target gradient line that distinguishes the display region from the left black edge region of the current frame of image, wherein the first width threshold is greater than the second width threshold; and for a right black edge region, processing gradient information of a current column and gradient information of two columns which are adjacent to the current column respectively by filtering to obtain an average gradient, determining when the average gradient is greater than the first width threshold, the current column as a first target gradient line that distinguishes the display region from the right black edge region of the current frame of image, or determining when the average gradient is greater than the second width threshold, the current column as a second target gradient line that distinguishes the display region from the right black edge region of the current frame of image.

15. The method for detecting a display region of a video image in real time according to claim 14, wherein said determining a boundary bright line for the display region of the current frame of image according to positions of the bright pixel threshold line, the time-domain warning line and the target gradient line, comprises: for the upper black edge region or the lower black edge region or the left black edge region or the right black edge region, determining when a first bright pixel threshold line exists, the first bright pixel threshold line as a reference bright pixel threshold line;

determining, when the first bright pixel threshold line does not exist and a second bright pixel threshold line exists, the second bright pixel threshold line as the reference bright pixel threshold line;

determining, when both the first bright pixel threshold line and the second bright pixel threshold line do not exist, a bright pixel threshold line of the immediately preceding video frame as the reference bright pixel threshold line.

16. The method for detecting a display region of a video image in real time according to claim 15, said determining a boundary bright line between the display region and the black edge region of the current frame of image according to positions of the bright pixel threshold line, the time-domain warning line and the target gradient line, comprises:

for the upper black edge region or the lower black edge region or the left black edge region or the right black edge region, when both the first time-domain warning line and the first target gradient line exist, determining, if the position of the first target gradient line is adjacent to the position of the first time-domain warning line, the first target gradient line as the boundary bright line between the display region and the black edge region of the current frame of image;

determining, if the position of the reference bright pixel threshold line is adjacent to or the same as the position of the first target gradient line, one of the reference bright pixel threshold line and the first target gradient line which is at the position closer to the inside of the display region as the boundary bright line;

determining, if the position of the first gradient line is at an outer side of the reference bright pixel threshold line, the boundary bright line between the display region and the black edge region of the current video frame is determined according to the first target gradient line and the first time-domain warning line; or determining, if the position of the first target gradient line is located at an inner side of the reference bright pixel threshold line, the boundary bright line of the current video frame is determined according to information on the boundary bright line of the immediately preceding video frame of the current video frame and information on boundary bright line of the current video frame.

17. The method for detecting a display region of a video image in real time according to claim 16, said determining the boundary bright line between the display region and the black edge region of the current video frame according to the first target gradient line and the first time-domain warning line, comprises:

determining, if the first time-domain warning line is located at a position at an inner side of the first target gradient line and the first target gradient line is not at an image boundary, the first target gradient line is determined as the boundary bright line between the display region and the black edge region of the current video frame;

maintaining, if the position of the first time-domain warning line is located at the inner side of the first target gradient line and the first target gradient line is located at the image boundary, the boundary bright line of the immediately preceding video frame as the boundary bright line of the current video frame; or determining, if the position of the first time-domain warning line is located at an inner side of the first target gradient line, the boundary bright line output as zero.

18. The method for detecting a display region of a video image in real time according to claim 16, said determining, if the position of the first target gradient line is located at an inner side of the reference bright pixel threshold line, the boundary bright line of the current video frame according to information on the boundary bright line of the immediately preceding video frame of the current video frame and information on boundary bright line of the current video frame, comprises: if a target gradient line of the immediately preceding video frame is adjacent to the position of the first target gradient line of the current video frame, determining, if the first time-domain warning line of the current video frame is located at an inner side of the first target gradient line, the first target gradient line as the boundary bright line between the display region and the black edge region of the current video frame; or if the first time-domain warning line of the current video frame is located at an outer side of the first target gradient line, and the time-domain warning line of the immediately preceding video frame is located at an inner side of the first time-domain warning line of the current video frame, determining if the immediately preceding video frame has captions which do not change or the immediately preceding video frame has no captions, the first target gradient line as the boundary bright line between the display region and the black edge region of the current video frame, or determining if the immediately preceding video frame has captions which change, the reference bright pixel threshold line as the boundary bright line between the display region and the black edge region of the current video frame; or determining if the first time-domain warning line of the current video frame is located at the outer side of the first target gradient line, and the time-domain warning line of the immediately preceding video frame is located at an outer side of the first time-domain warning line of the current video frame, the reference bright pixel threshold line as the boundary bright line between the display region and the black edge region of the current video frame.

19. The method for detecting a display region of a video image in real time according to claim 18, said determining, if the position of the first target gradient line is located at an inner side of the reference bright pixel threshold line, the boundary bright line of the current video frame according to information on the boundary bright line of the immediately preceding video frame of the current video frame and information on boundary bright line of the current video frame, further comprises: if the gradient line of the immediately preceding video frame is not adjacent to the position of the first target gradient line of the current video frame, determining, if the first time-domain warning line is located at the inner side of the first target gradient line, the first target gradient line as the boundary bright line between the display region and the black edge region of the current video frame; or searching for, if the first time-domain warning line is located at the outer side of the first target gradient line, the second target gradient line at the outer side of the first time-domain warning line, and determining, if the second target gradient line is found, the second target gradient line as the boundary bright line between the display region and the black edge region of the current video frame; or if the first time-domain warning line is located at the outer side of the first target gradient line and the second target gradient line is not found, determining a line of the reference bright pixel threshold line and the time-domain warning line of the immediately preceding video frame, which is closer to the outside of the display region, as the boundary bright line if the time-domain warning line of the immediately preceding video frame is located at an outer side of the second time-domain warning line, or determining the first target gradient line as the boundary bright line if the time-domain warning line of the immediately preceding video frame is located at an inner side of the second time-domain warning line and the immediately preceding video frame has captions which do not change or has no captions, or determining a reference zero threshold line as the boundary bright line if the time-domain warning line of the immediately preceding video frame is located at the inner side of the second time-domain warning line and the immediately preceding video frame has captions which change.

20. An electronic device comprising:
an apparatus for performing the method for detecting a display region of a video image in real time according to claim 1, configured to determine the display region of the video image;
an image processing apparatus configured to process the display region of the video image;
a display apparatus connected to the image processing apparatus and configured to display the processed video image.

* * * * *